US010261679B2

(12) United States Patent
Boodhoo et al.

(10) Patent No.: US 10,261,679 B2
(45) Date of Patent: Apr. 16, 2019

(54) DIGITAL RESOURCE MANAGEMENT SYSTEM

(71) Applicant: Knowlio, Inc., Austin, TX (US)

(72) Inventors: Jean-Paul Sylvain Boodhoo, Cypress County (CA); Will McGarrett Harper, Austin, TX (US)

(73) Assignee: Knowlio, Inc., Austin, TX (US)

( * ) Notice: Subject to any disclaimer, the term of this patent is extended or adjusted under 35 U.S.C. 154(b) by 157 days.

(21) Appl. No.: 15/270,969

(22) Filed: Sep. 20, 2016

(65) Prior Publication Data
US 2017/0083222 A1 Mar. 23, 2017

Related U.S. Application Data

(60) Provisional application No. 62/221,337, filed on Sep. 21, 2015, provisional application No. 62/246,522, (Continued)

(51) Int. Cl.
G06F 17/21 (2006.01)
G06F 17/22 (2006.01)
(Continued)

(52) U.S. Cl.
CPC ...... *G06F 3/04847* (2013.01); *G06F 3/04817* (2013.01); *G06F 17/218* (2013.01); (Continued)

(58) Field of Classification Search
CPC ............. G06F 3/04847; G06F 17/2247; G06F 17/247; G06F 17/248; G06F 3/04817; (Continued)

(56) References Cited

U.S. PATENT DOCUMENTS 5,715,445 A 2/1998 Wolfe
5,802,292 A 9/1998 Mogul
(Continued)

FOREIGN PATENT DOCUMENTS

DE 10332492 B4 2/2005

OTHER PUBLICATIONS

PCT International Search Report and Written Opinion, PCT Application No. PCT/US16/58720, dated Jan. 19, 2017, 14 pages.
(Continued)

*Primary Examiner* — Jeffrey A Gaffin
*Assistant Examiner* — Bille M Dahir
(74) *Attorney, Agent, or Firm* — Fenwick & West LLP

(57) ABSTRACT

A computer device enables a user to construct presentations from independent Hosted Information Resources. A dynamic navigation user interface includes a navigation specific user interface control element that when selected cause the web browser to navigate between the ordered set of digital resources in the resource data set. The client device causes the display screen to display the webpage with the dynamic navigation user interface in the web browser. Responsive to the selection of a control element in the dynamic navigation user interface, the web browser application loads the next resource of the ordered set of resources and updated dynamic navigation user interface is generated.

21 Claims, 25 Drawing Sheets

Related U.S. Application Data filed on Oct. 26, 2015, provisional application No. 62/321,706, filed on Apr. 12, 2016, provisional application No. 62/340,940, filed on May 24, 2016, provisional application No. 62/393,594, filed on Sep. 12, 2016.

(51) Int. Cl.
  *G06F 17/24* (2006.01)
  *G06F 3/0481* (2013.01)
  *G06F 3/0484* (2013.01)

(52) U.S. Cl.
  CPC ........ *G06F 17/2247* (2013.01); *G06F 17/247* (2013.01); *G06F 17/248* (2013.01)

(58) Field of Classification Search
  CPC ............. G06F 17/3089; G06F 17/2186; G06F 17/30873; H04N 1/00416
  See application file for complete search history.

(56) References Cited

U.S. PATENT DOCUMENTS

| | | | |
|---|---|---|---|
| 5,809,247 A * | 9/1998 | Richardson | G06F 17/30873 707/E17.111 |
| 5,946,682 A | 8/1999 | Wolfe | |
| 6,006,252 A | 12/1999 | Wolfe | |
| 6,151,603 A | 11/2000 | Wolfe | |
| 6,297,819 B1 | 10/2001 | Furst | |
| 6,516,340 B2 | 2/2003 | Boys | |
| 6,572,662 B2 | 6/2003 | Manohar et al. | |
| 6,792,430 B1 | 9/2004 | Kenyon et al. | |
| 6,934,737 B1 | 8/2005 | Tang et al. | |
| 7,165,070 B2 | 1/2007 | Page et al. | |
| 7,209,928 B2 | 4/2007 | Kenyon | |
| 7,302,638 B1 | 11/2007 | Wolfe | |
| 7,346,848 B1 | 3/2008 | Ruthfield et al. | |
| 7,389,241 B1 | 6/2008 | Bascom | |
| 7,627,826 B2 | 12/2009 | Pry | |
| 7,996,494 B2 | 8/2011 | Allamaraju et al. | |
| 8,078,972 B2 | 12/2011 | Sullivan et al. | |
| 8,510,682 B2 | 8/2013 | Kusterer et al. | |
| 8,635,021 B2 | 1/2014 | Heng et al. | |
| 8,661,361 B2 | 2/2014 | Morris | |
| 8,780,130 B2 | 7/2014 | Morris | |
| 8,856,675 B1 | 10/2014 | Agarawala et al. | |
| 8,966,373 B2 | 2/2015 | Wan | |
| 9,279,685 B1 | 3/2016 | Heng et al. | |
| 9,727,301 B2 | 8/2017 | Sweet | |
| 9,846,535 B2 | 12/2017 | Paine et al. | |
| 2002/0054114 A1 | 5/2002 | Shuping et al. | |
| 2003/0071849 A1 | 4/2003 | Ferri | |
| 2004/0049541 A1 | 3/2004 | Swahn | |
| 2004/0066411 A1 | 4/2004 | Fung et al. | |
| 2005/0202385 A1 | 9/2005 | Coward et al. | |
| 2006/0085741 A1 | 4/2006 | Weiner et al. | |
| 2006/0112130 A1 | 5/2006 | Lowson | |
| 2007/0136313 A1 | 6/2007 | Dutta | |
| 2008/0005752 A1 | 1/2008 | Morris | |
| 2009/0006981 A1 | 1/2009 | Pagan | |
| 2009/0044142 A1* | 2/2009 | Faris | G06F 17/30873 715/780 |
| 2009/0125819 A1 | 5/2009 | Hamilton, II et al. | |
| 2009/0204900 A1* | 8/2009 | Champion | G06F 3/0482 715/738 |
| 2010/0079392 A1 | 4/2010 | Chiang et al. | |
| 2010/0138767 A1 | 6/2010 | Wang et al. | |
| 2012/0030664 A1 | 2/2012 | Demant | |
| 2012/0042251 A1 | 2/2012 | Rodriguez | |
| 2013/0173291 A1 | 7/2013 | Kelly et al. | |
| 2013/0297206 A1 | 11/2013 | Heng et al. | |
| 2013/0305184 A1 | 11/2013 | Kim et al. | |
| 2014/0317556 A1 | 10/2014 | Ellenich et al. | |
| 2014/0325400 A1 | 10/2014 | Zhao et al. | |
| 2015/0006535 A1* | 1/2015 | Hayden | G06F 17/30412 707/737 |
| 2015/0026548 A1 | 1/2015 | Morris | |
| 2015/0067605 A1 | 3/2015 | Zambetti et al. | |
| 2015/0186245 A1 | 7/2015 | Hoen, IV et al. | |
| 2015/0256652 A1 | 9/2015 | Santoro et al. | |
| 2016/0147400 A1 | 5/2016 | Patten | |
| 2016/0357388 A1 | 12/2016 | Paine et al. | |
| 2016/0378272 A1 | 12/2016 | Whitlark et al. | |

OTHER PUBLICATIONS

PCT International Search Report and Written Opinion, PCT Application No. PCT/US17/27066, dated Jun. 29, 2017, 20 pages.

* cited by examiner

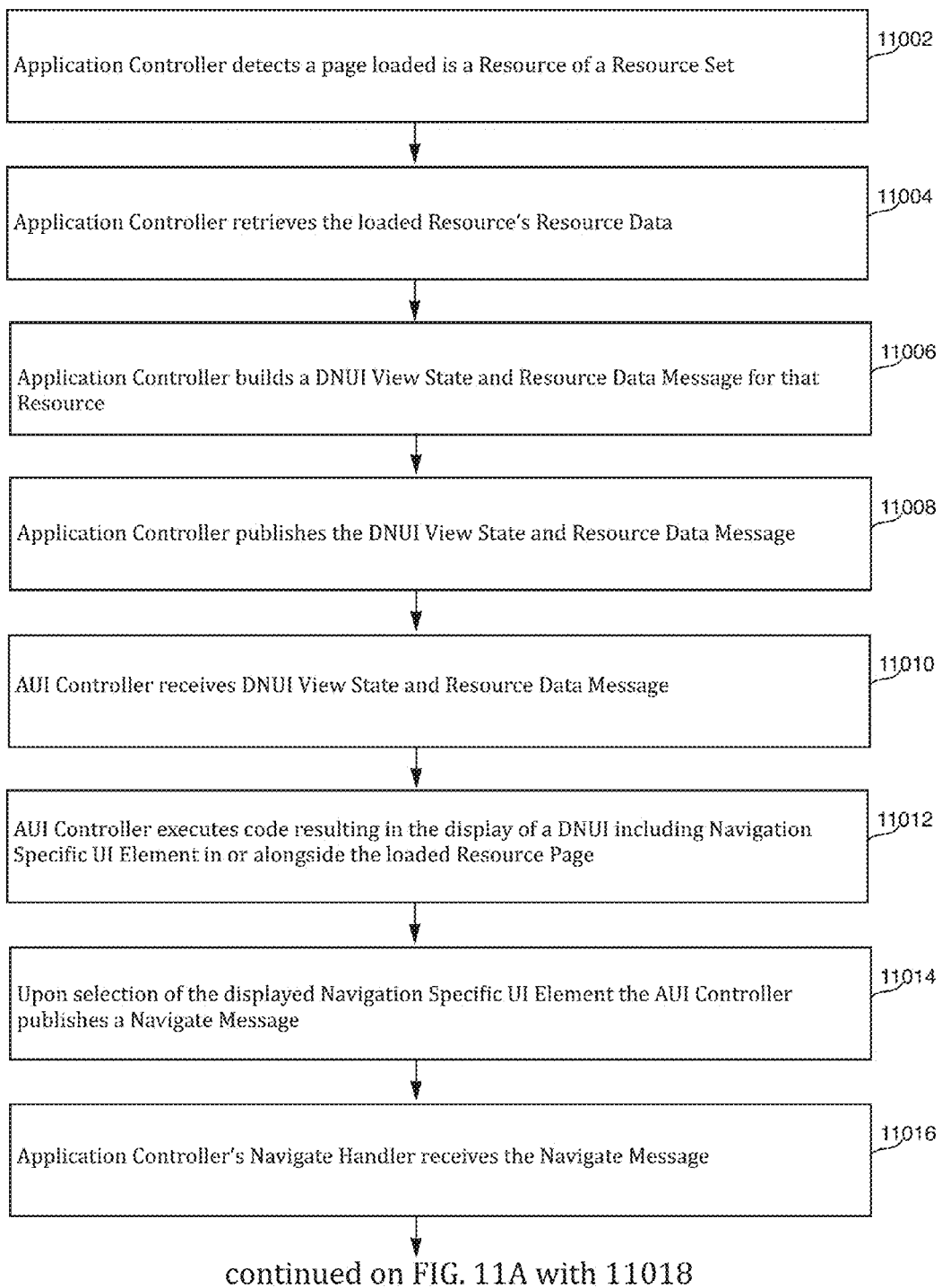

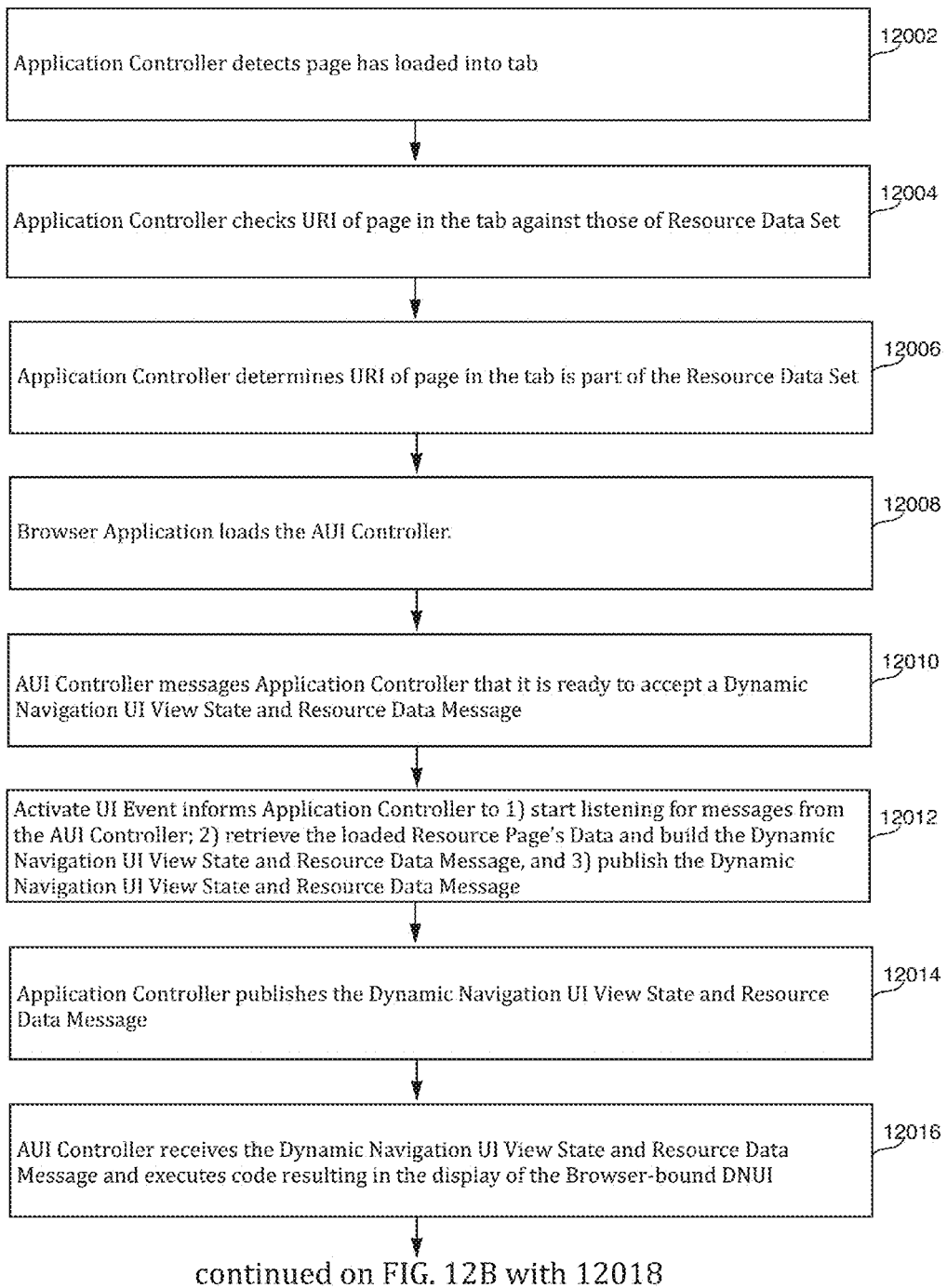

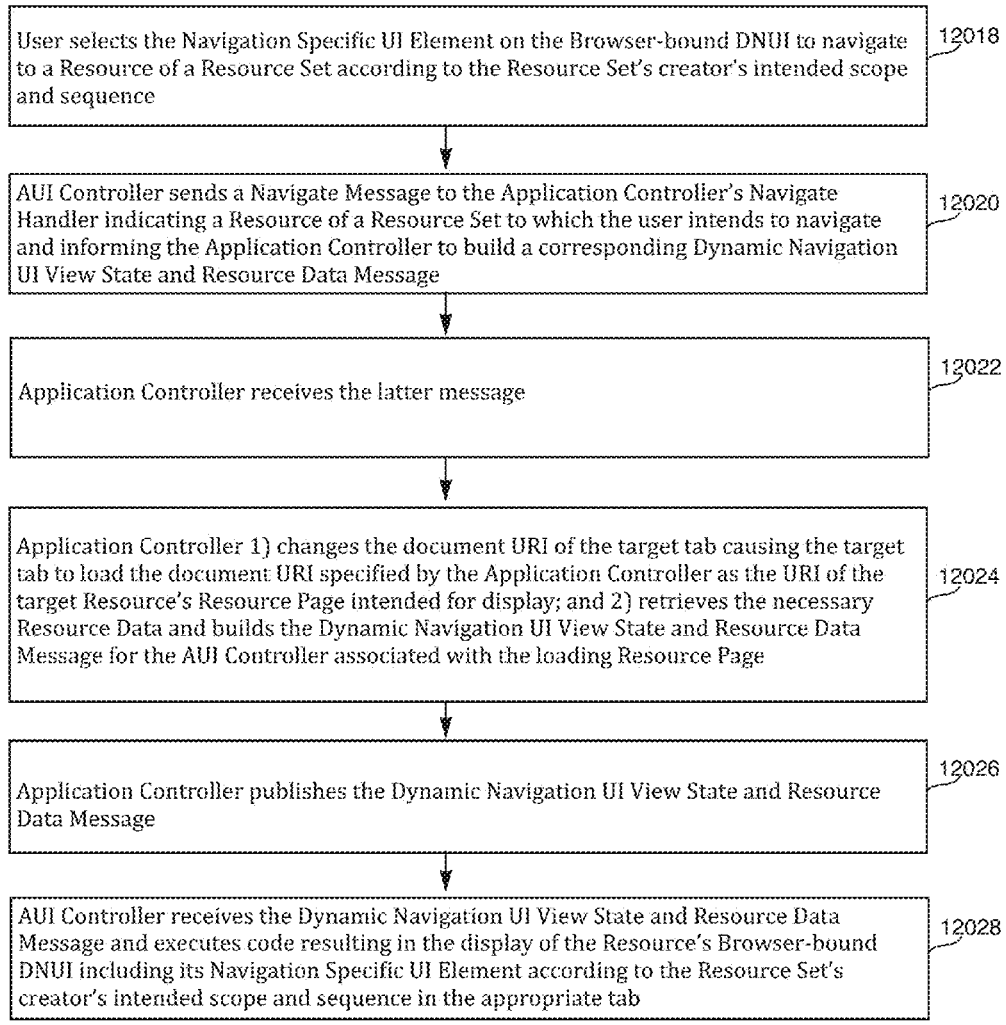

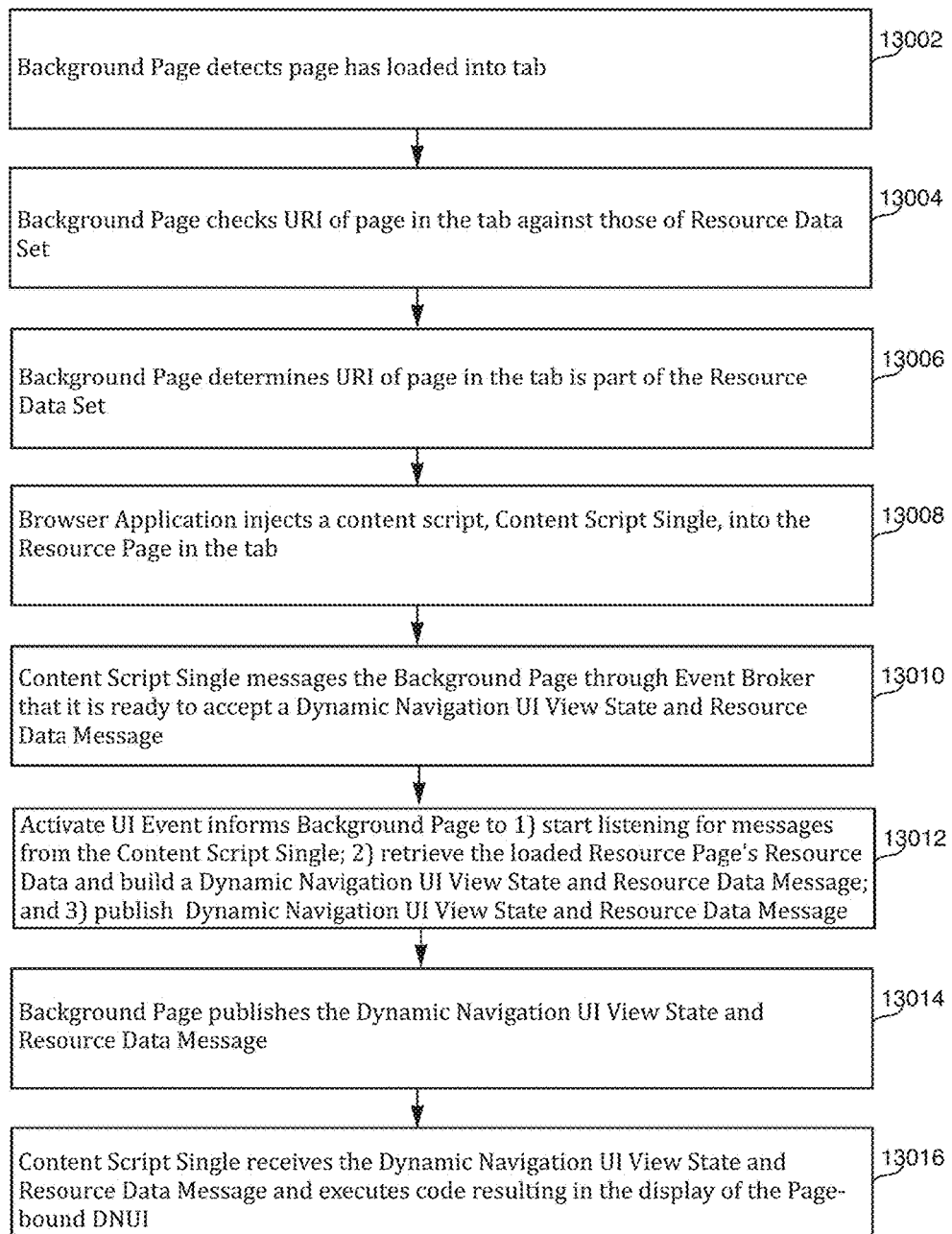

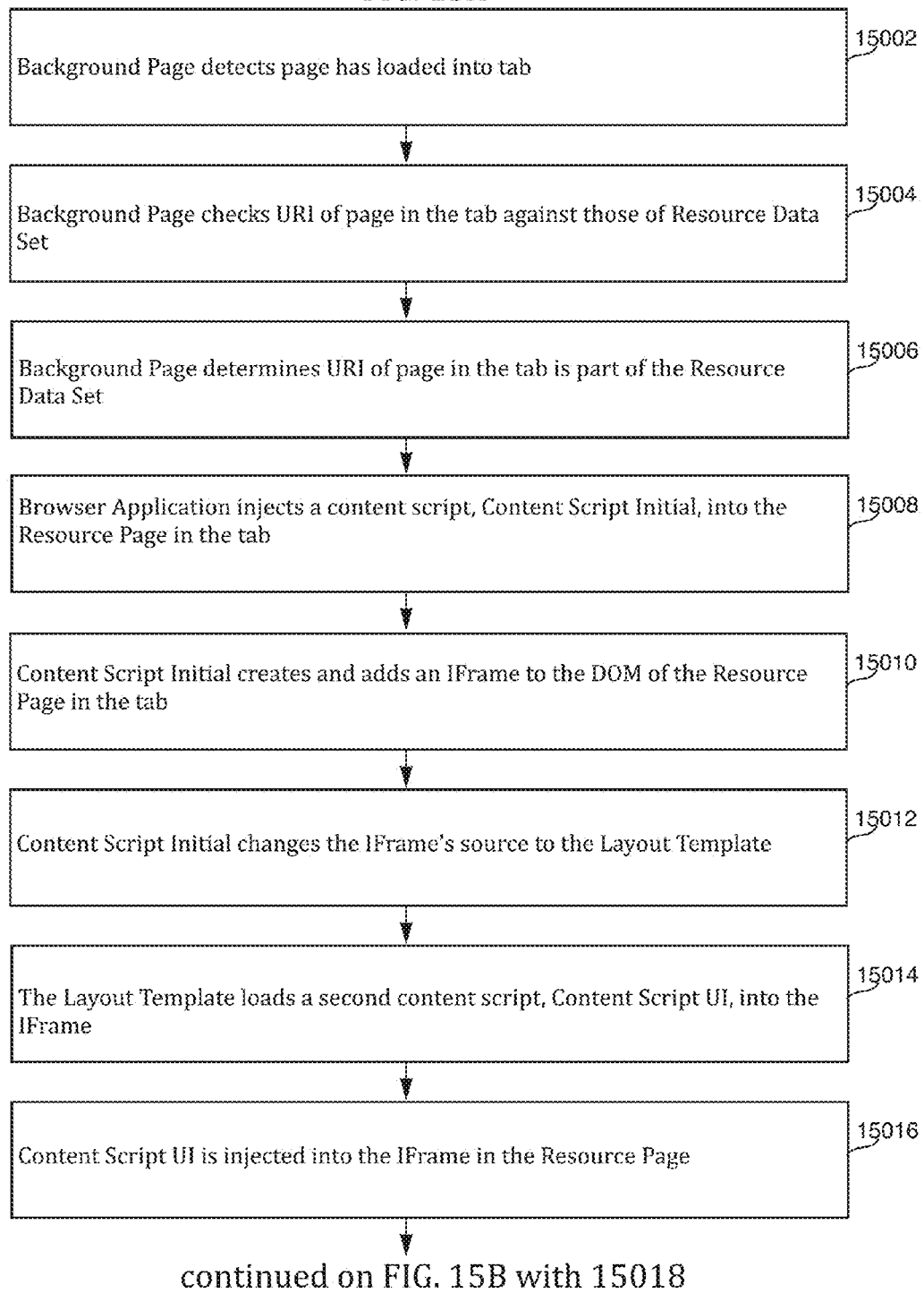

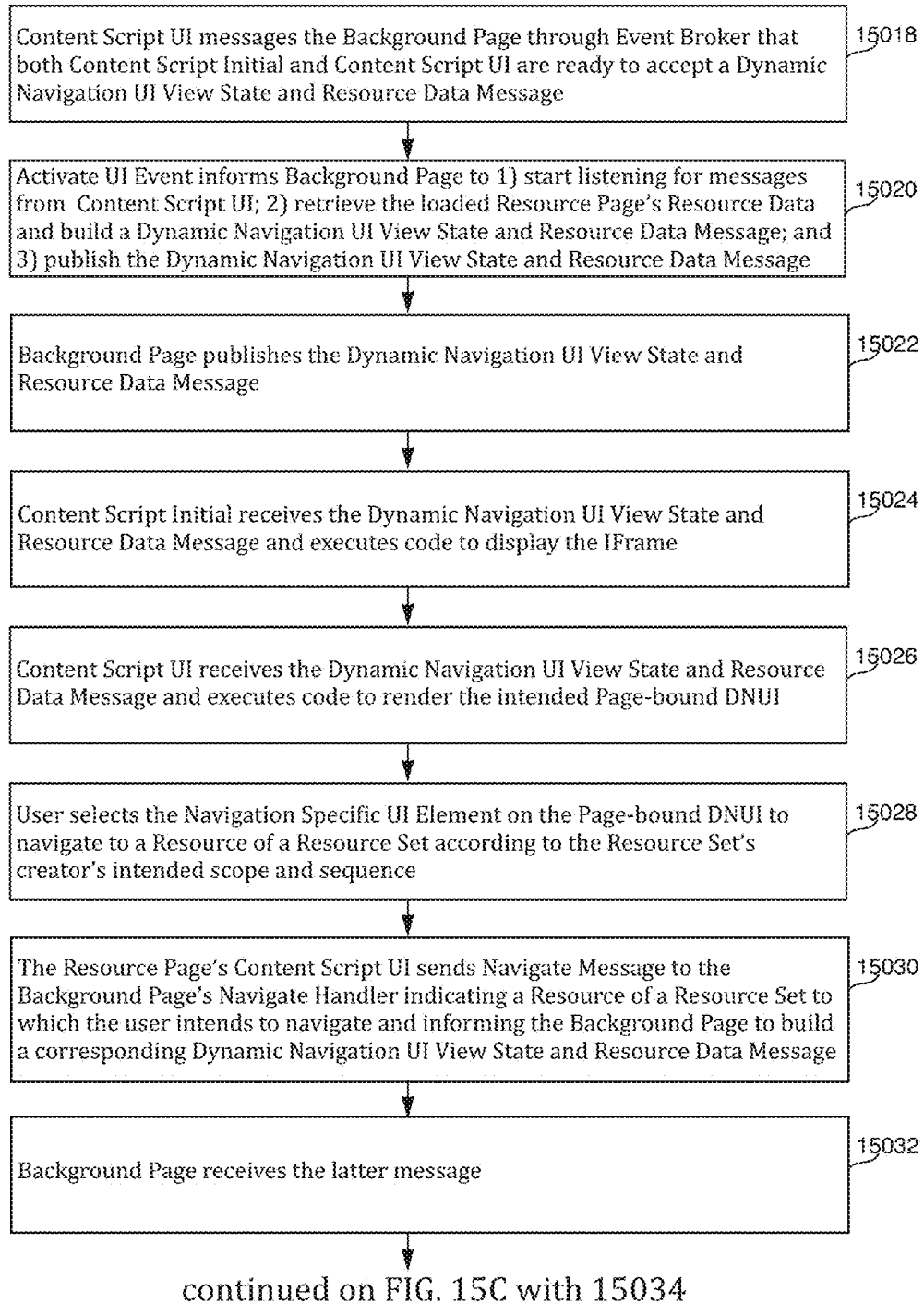

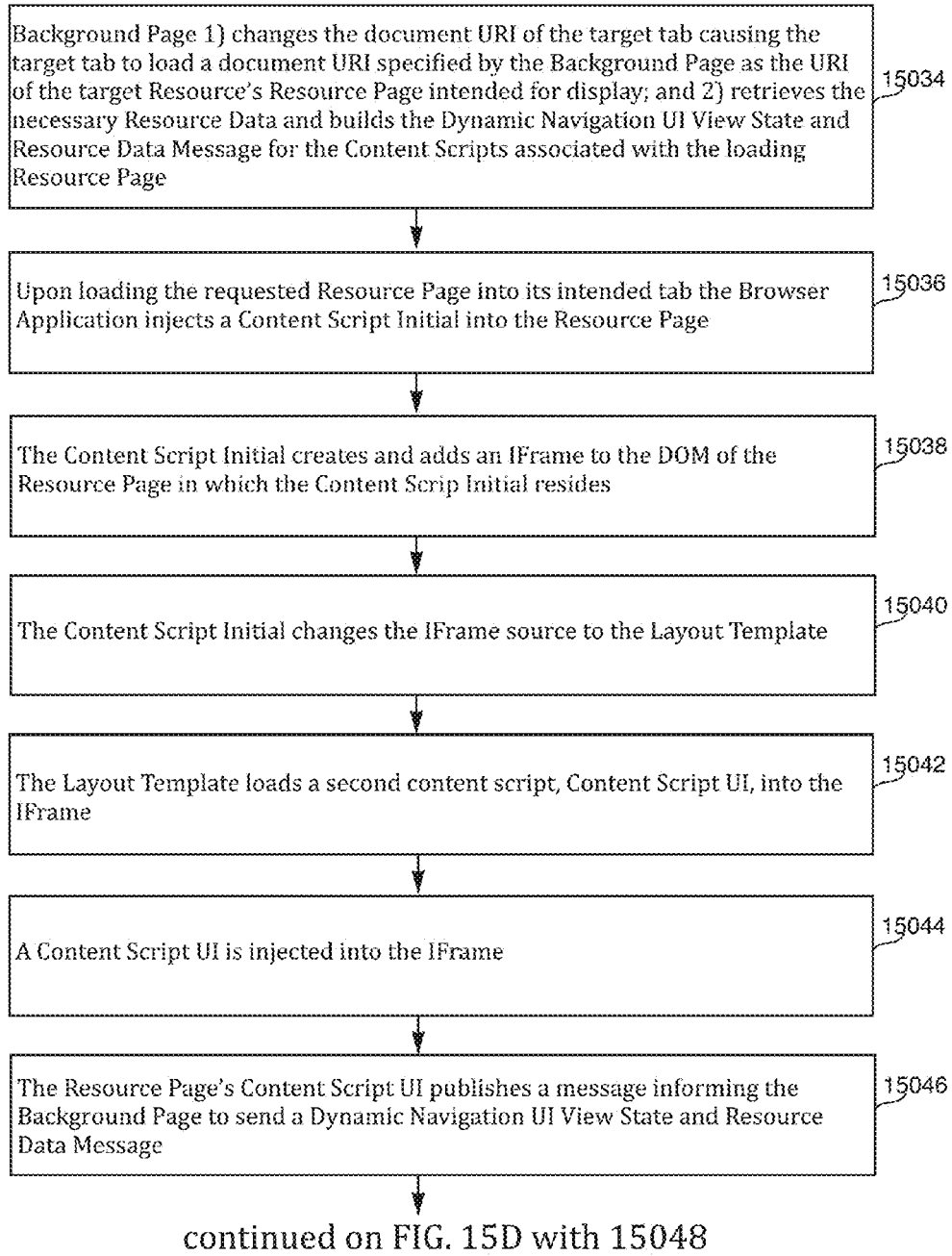

DIGITAL RESOURCE MANAGEMENT SYSTEM

RELATED APPLICATIONS

This application claims the benefit of U.S. Provisional Application No. 62/221,337 entitled "Digital Resource Management System," filed on Sep. 21, 2015, U.S. Provisional Application No. 62/246,522 entitled "Digital Resource Management System," filed on Oct. 26, 2015, U.S. Provisional Application No. 62/321,706 entitled "Digital Resource Management System," filed on Apr. 12, 2016, U.S. Provisional Application No. 62/340,940 entitled "Digital Resource Management System," filed on May 24, 2016, and U.S. Provisional Application No. 62/393,594 entitled "Digital Resource Management System," filed on Sep. 12, 2016, the contents of which are each incorporated by reference herein.

BACKGROUND

Technical Field

The present disclosure relates to generally to digital resource management and more specifically to navigating digital resources in a web browser.

Description of Related Art

There are billions of Information Resources available on computer networks, the most prominent/widely used of which is the World Wide Web. An Information Resource can be hosted independently of other Information Resources on a computer network by being stored at a unique location defined by a unique Uniform Resource Identifier (URI). Each of these independent Hosted Information Resources may provide unique and valuable content and/or functions.

Users frequently may want to group and display one or more of these independent Hosted Information Resources as a defined, cohesive, and, at times, explicitly sequential hosted resource set. A user can present these independent Hosted Information Resource sets either to an external audience or to him/herself; the latter act often constituting study or review.

SUMMARY

In an embodiment, a method controls navigation of digital resources in a web browser application executing on a client device in a networked computer environment. The client device detects that a webpage has been loaded into the web browser application. The client device determines if first identifying information associated with the webpage matches corresponding second identifying information of a digital resource of an ordered set of digital resources in a resource data set stored in a storage medium. This determining step includes detecting if a uniform resource identifier of the webpage matches a uniform resource identifier of the digital resource. Responsive to determining that the first identifying information associated with the webpage matches the second identifying information associated with the digital resource of the resource data set, the client device executes instructions to generate a dynamic navigation user interface for display on a display screen of the client device. The dynamic navigation user interface includes a navigation specific user interface control element that when selected cause the web browser to navigate between the ordered set of digital resources in the resource data set. The client device causes the display screen to display the webpage with the dynamic navigation user interface in the web browser application. An input is received indicating a selection of the navigation specific user interface control element in the dynamic navigation user interface to navigate to a next webpage of the ordered set of digital resources. Responsive to the input, the web browser application loads the next webpage of the ordered set of resources. The client device executes instructions to generate an updated dynamic navigation user interface. The client device causes the display screen to display the next webpage with the updated dynamic navigation user interface in the web browser application.

In another embodiment, a non-transitory computer-readable storage medium stores instructions that when executed by a processor causes the processor to perform the process steps described above.

In yet another embodiment, a computer device comprises a processor and a non-transitory computer-readable storage medium stores instructions that when executed by a processor causes the processor to perform the process steps described above.

BRIEF DESCRIPTION OF THE DRAWINGS

The disclosed embodiments have other advantages and features which will be more readily apparent from the detailed description, the appended claims, and the accompanying figures (or drawings). A brief introduction of the figures is below.

FIGS. 11A-11B are flowcharts illustrating an embodiment of a second process for navigating between digital resources using a dynamic navigation user interface.

FIGS. 12A-12B are flowcharts illustrating an embodiment of a process for navigating between digital resources using a dynamic navigation user interface using a browser-bound configuration.

FIGS. 13A-13C are flowcharts illustrating an embodiment of a first process for navigating between digital resources using a dynamic navigation user interface using a page-bound configuration.

FIGS. 15A-15D are flowcharts illustrating an embodiment of a third process for navigating between digital resources using a dynamic navigation user interface using a page-bound configuration.

DETAILED DESCRIPTION

Figure 1:
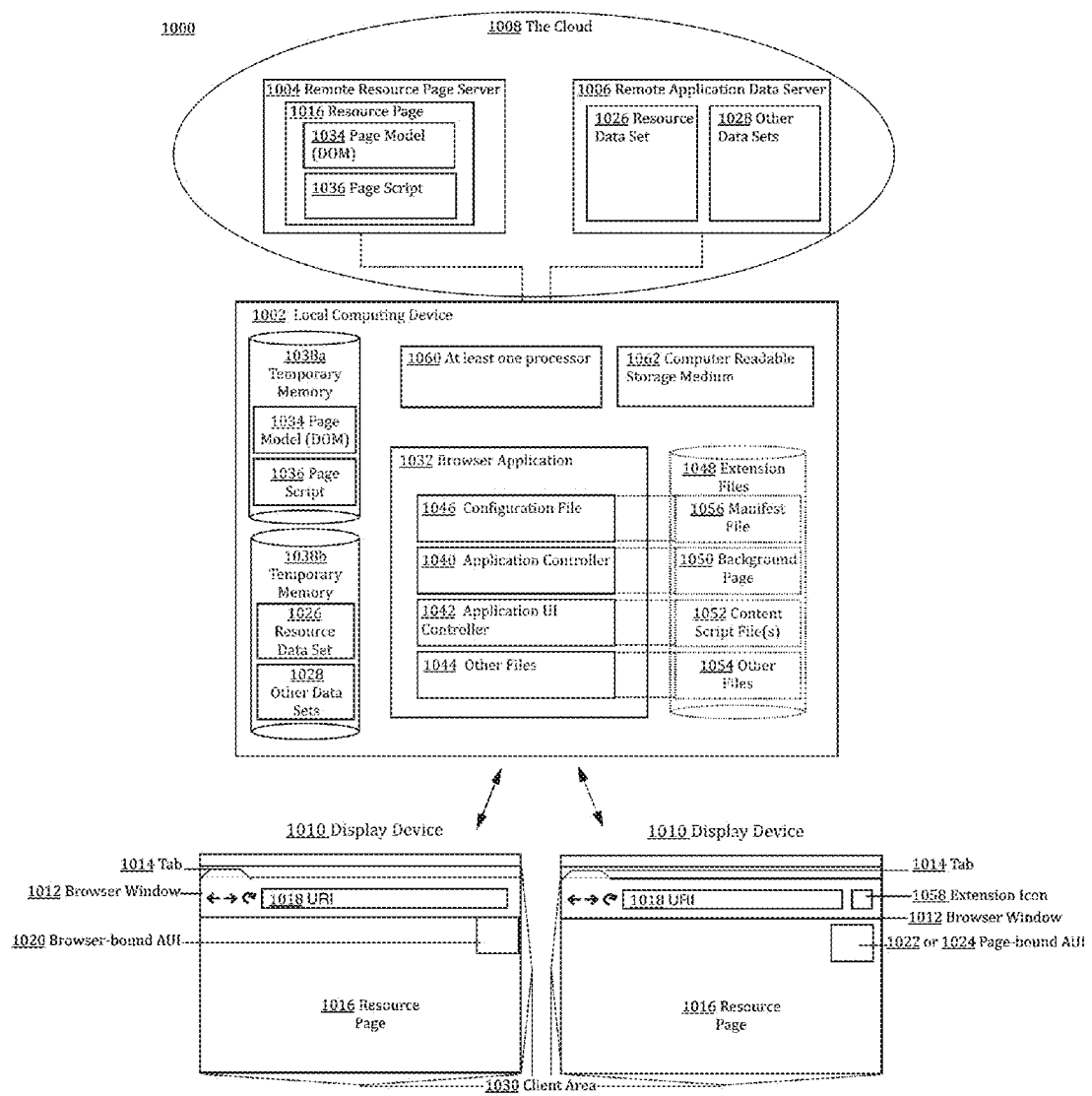
FIG. 1 is a block diagram illustrating a first example embodiment of a system for enabling navigation between digital resources in a networked computer environment.

The Figures (FIGS.) and the following description relate to various embodiments by way of illustration only. From the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Overview

A Resource Set Presentation Process (RSPP) is a process by which a computer device enables a user to construct presentations from independent Hosted Information Resources. To do so, the RSPP spans the breadth of the information cycle, including information collection, organization, enrichment, and presentation, including sharing to one or more users.

Using the RSPP, a user can interact with the computer device to construct a presentation useful for a number of pursuits including education, business, travel, and other fields. A professor can quickly construct a presentation composed of a chapter from an eTextbook, a scholarly article, Google Map views centered on the place of study, a worksheet from ExcelOnline, and other independent Hosted Information Resources available to the professor and her students. A financial analyst can quickly construct a presentation composed of a Google Doc containing an investment thesis, bank reports, Google Map views displaying areas relevant to an investment, a workbook from ExcelOnline, a stock chart from Yahoo Finance, and other independent Hosted Information Resources available to the analyst and her associates. A travel agent or independent traveler can quickly construct a presentation composed of the traveler's daily itineraries, Google Map views showing tour routes, background information on tourist destinations, emergency contact information, and any other independent Hosted Information Resources available to the travel agent, her clients, and/or the independent traveler.

An aspect of the RSPP is that each presentation constructed using the RSPP may convey the presentation's creator's intended scope and sequence of the constituent independent Hosted Information Resources.

To provide this function, the RSPP may include a Resource Set Navigation Process (RSNP) in which a computer device enables a user to navigate between resources. The Resource Set Navigation Process depends on the existence of a Resource Set composed of a discrete set of one or more Resources, each of which may be composed of one or more Resource Pages and/or Resource Page Selections and the one or more Resource Pages' and/or Resource Page Selections' associated Resource Data. A Resource Page is a webpage. A Resource Page Selection may be a specific view, state or collection of one or more elements of a Resource Page; a Resource Page Selection may be a Resource Page in its entirety. For the sake of clarity and readability a Resource Page may refer to both a Resource Page or Resource Page Selection in multiple instances throughout this filing. Resource Data is data constituting a Resource's organizational, informational, and/or locational attributes that is accessible, readable, and retrievable for use in the RSPP. Resource Data may include but is not limited to one or more of the following: each Resource's title; each Resource's Resource Page's network location (URI) or Resource Pages' network locations (URIs); one or more attributes defining a Resource Page Selection; one or more Resource Sets, Groups, or Sub-Groups with which each Resource is associated; each Resource's display order within one or more Resource Sets; each Resource's displays of one or more of the Resource's URIs including but not limited to displays of one or more URIs within DOM element pop-ups; each Resource's other informational context that includes but is not limited to tags, text files, audio files, instructions indicating which sections of a Resource Page to emphasize, and links to other Resources.

The Resource Set Navigation Process enables the repetitive selection of the same Navigation Specific UI Element in the Dynamic Navigation User Interface (DNUI) to result in the display of Resources in a Resource Set according to the Resource Set's creator's intended scope and sequence. A Navigation Specific UI Element refers to a UI element that may include but is not limited to directional arrows or buttons indicating concepts of sequence that are displayed in order to provide the means with which a next (next or previous of an ordered set) Resource in the Resource Set can be accessed according to the Resource Set's creator's intended scope and sequence. The DNUI is a user interface that makes certain functions, including but not limited to some or all of the following, available to the user: 1) repetitive selection of the same Navigation Specific UI Element in the DNUI to result in the display of one or more Resources in a Resource Set according to the Resource Set's creator's intended scope and sequence; 2) the display of Resource Data specific to each Resource in a Resource Set; 3) the means to access any Resource Data within any Resource Data Set; 4) the means to edit any Resource Data within any Resource Data Set; and 5) the means to share any Resource Data Set with any number of computing devices and servers on a computer network. The Resource Set Navigation Process and variations thereof are described in detail below.

FIG. 1 is a block diagram of a system 1000 for performing several of the Resource Set Presentation Processes including but not limited to the Resource Set Navigation Process (RSNP). In the example of FIG. 1, a Local Computing Device 1002 is illustrated as communicating with multiple remote servers, a Remote Resource Page Server 1004 and a Remote Application Data Server 1006, in The Cloud 1008 in order to provide, using a Display Device 1010, one or more Browser Windows 1012 with Tabs 1014 each of which may display 1) a Resource Page 1016, at a URI 1018, that may be stored at the Remote Resource Page Server 1004; and/or 2) an Application UI (AUI) (e.g., a Browser-bound AUI 1020, a Page-bound AUI 1022, or a Page-bound AUI 1024) that may include Resource Data of a Resource Data Set 1026 and Other Data of Other Data Sets 1028 that may be stored at the Remote Application Data Server 1006 and other elements which are stored in various system components at different times in the Resource Set Presentation Process (RSPP). FIG. 1 shows two non-limiting examples of how an AUI could be rendered in a Tab 1014 of a Browser Window 1012 and displayed in the Client Area 1030 of the Display Device 1010. An AUI also may be rendered in a separate pop-up window not specifically illustrated in the example of system 1000.

Figure 2:
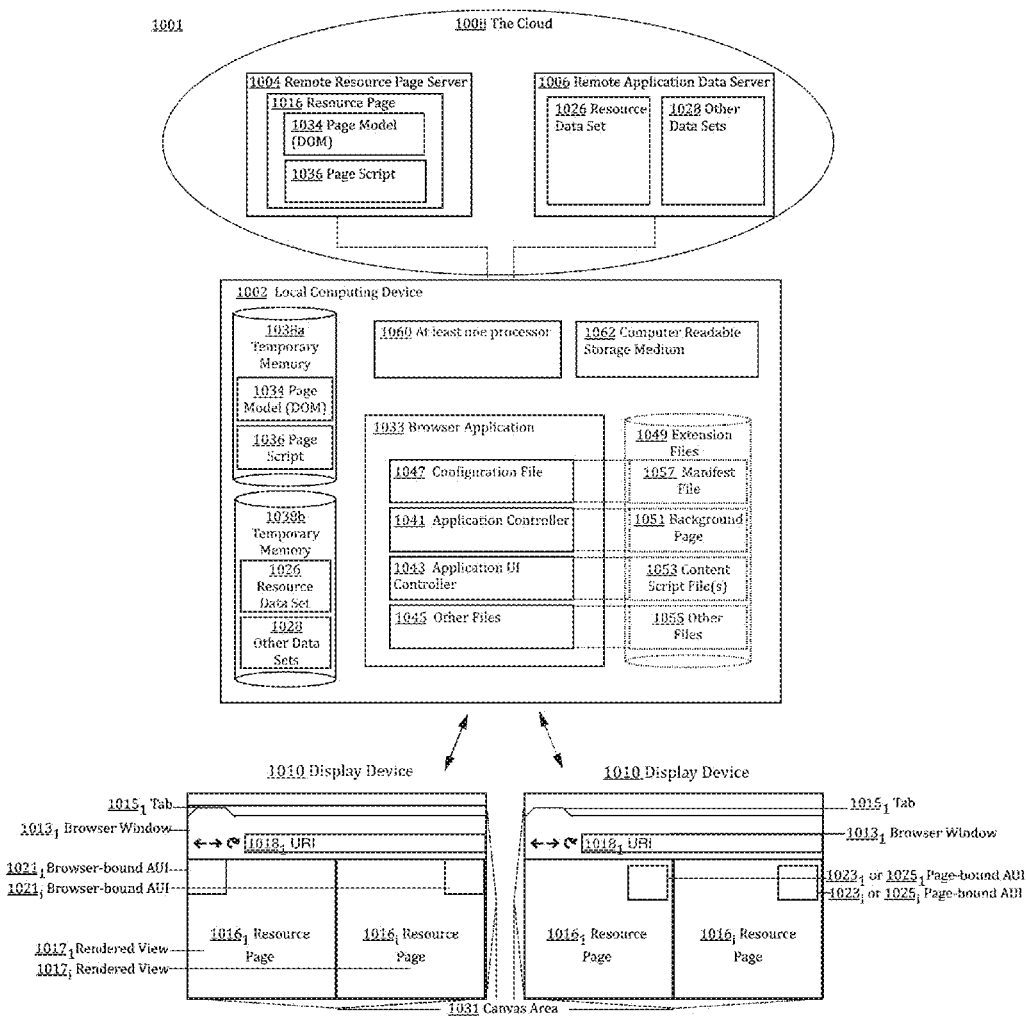
FIG. 2 is a block diagram illustrating a second example embodiment of a system for enabling navigation between digital resources in a networked computer environment.

The components represented in FIG. 1 may be modified to simultaneously display multiple Resources in the display area of a single browser window. System 1001 of FIG. 2 shows a non-limiting example of such a configuration. In the example of FIG. 2, a Local Computing Device 1002 is illustrated as communicating with multiple remote servers, a Remote Resource Page Server 1004 and a Remote Application Data Server 1006, in The Cloud 1008 in order to provide, using a Display Device 1010, a Browser Window 1013 with a Tab $1015_j$ and multiple Rendered Views $1017_1$ and $1017_i$ each of which may simultaneously display 1) a Resource Page $1016_1$ and $1016_i$, of the URIs $1018_1$ and $1018_i$, that may be stored at the Remote Resource Page Server 1004; and/or 2) an Application UI (AUI) (e.g., a Browser-bound AUI 1021, a Page-bound AUI 1023, or a Page-bound AUI 1025) that may include Resource Data of a Resource Data Set 1026 and Other Data of Other Data Sets 1028 that may be stored at the Remote Application Data Server 1006 and other elements which are stored in various system components at different times in the Resource Set Presentation Process (RSPP). FIG. 2 shows two non-limiting examples of how an AUI could be rendered in a Rendered View 1017 of Tab 1015 of a Browser Window 1013 and displayed in the Canvas Area 1031 of the Display Device 1010. An AUI also may be rendered in a separate pop-up window not specifically illustrated in the example of system 1001. A Rendered View represents an object representing the contents of a webpage displayed in a pop-up window or tab of a browser window. A tab and/or browser window may display the contents of one or more Rendered Views simultaneously.

In the description of FIGS. 1 and 2 that follows many components are numbered using numerical references to both FIGS. 1 and 2. In each case, the dual numerical reference is used to consolidate descriptive language that may apply to the component configured for both system 1000 and 1001. For example, "Browser Window" may be followed by the numerical reference 1012/1013 to indicate that the associated descriptive language applies to both the Browser Window of system 1000 and 1001, respectively.

Figure 3:
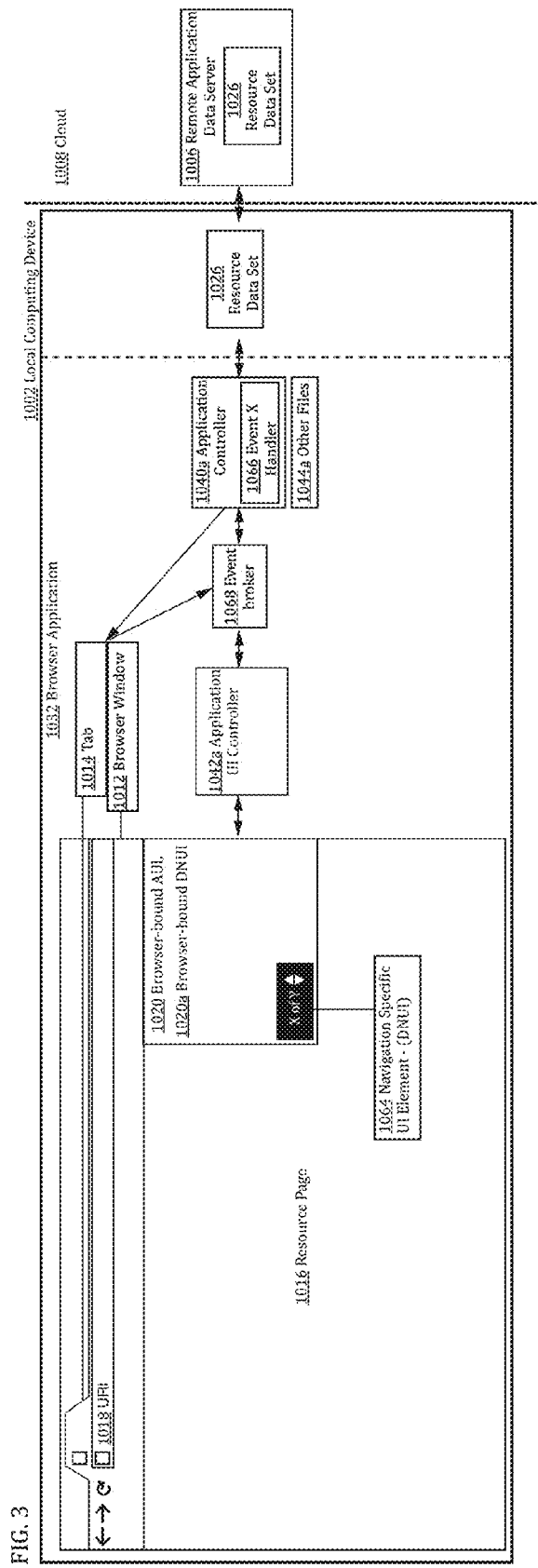
FIG. 3 is a block diagram illustrating a first example embodiment of user interface components and functional modules for implementing a browser-bound dynamic navigation user interface.
Figure 4:
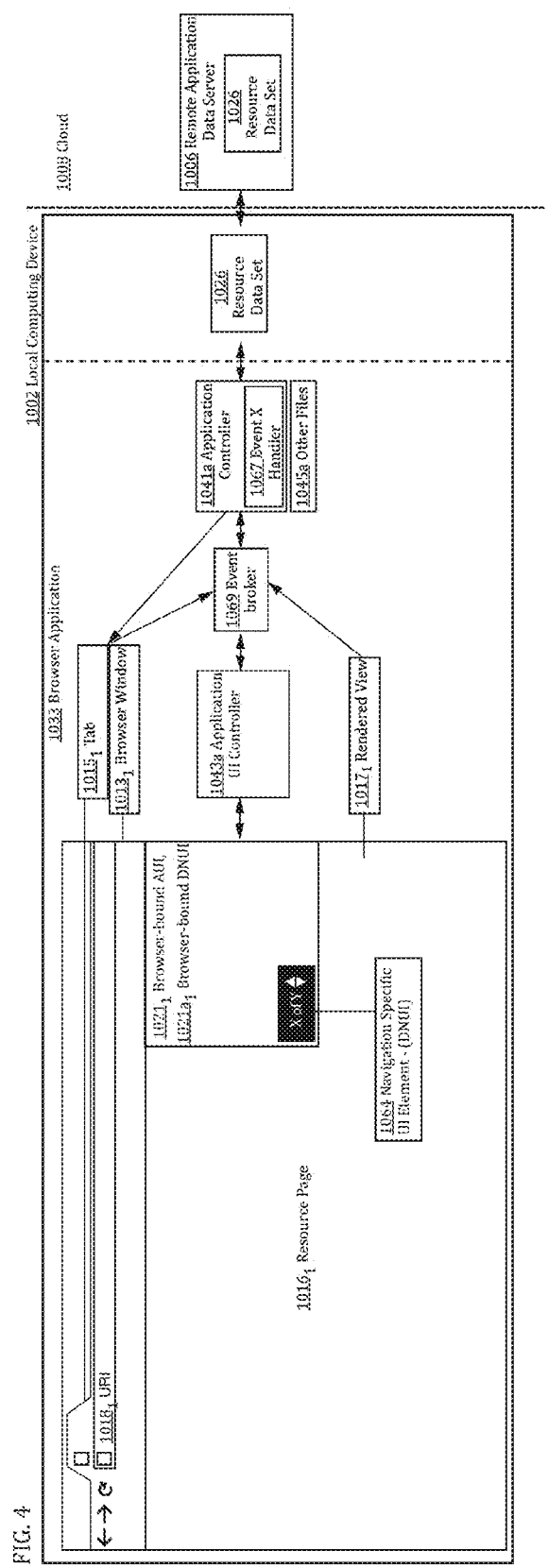
FIG. 4 is a block diagram illustrating a second example embodiment of user interface components and functional modules for implementing a browser-bound dynamic navigation user interface.

Continuing on, the components desirable for an example implementation of the Browser-bound AUI 1020/1021 shown in FIGS. 1 and 2 are illustrated and discussed in detail in FIGS. 3 and 4. The components desirable for an example implementation of the Page-bound AUI 1022 shown in FIG. 1 is illustrated and discussed in detail in FIG. 5. The components desirable for an example implementation of the Page-bound AUI 1024 shown in FIG. 1 is illustrated and discussed in detail in FIG. 6. FIGS. 3, 4, 5, and 6 are provided for the sake of clarity and serve only as non-limiting examples of the components desirable to render the Browser-bound AUI and Page-bound AUI and utilize each in the RSNP. With slight modification, those components represented in FIGS. 3 and 4 could render a Page-bound AUI instead of a Browser-bound AUI for use in RSNP. Also with slight modification, those components represented in FIGS. 5 and 6 could render a Browser-bound AUI instead of a Page-bound AUI for use in the RSNP.

As may be appreciated by one of skill in the art, a Local Computing Device 1002 may generally represent a computing device that may be configured to execute an otherwise conventional Browser Application 1032, and to communicate over a network with the Remote Resource Page Server 1004 and the Remote Application Data Server 1006. For example, the Local Computing Device 1002 may represent any standard desktop or personal computing device, such as any laptop, notebook, netbook computer, any tablet computer, any Smartphone or other mobile computing device, or any virtual reality headset. Such computing devices, and other computing devices, may be configured to access the Remote Resource Page Server 1004 and Remote Application Data Server 1006 over one or more computer networks, in any conventional manner. For example, many Local Computing Devices may include various types of network-related hardware/software which enable the Local Computing Device 1002 to communicate over the public internet, private intranet, or other network, with the Remote Resource Page Server 1004 and Remote Application Data Server 1006. The Display Device 1010 may represent one or more conventional types of display such as a monitor, touch-screen, virtual reality, or other type of visual or auditory display. In many cases, a single Local Computing Device 1002 may be associated with multiple displays. For sake of clarity and readability, Display Device 1010 may refer to either a single display device and/or multiple display devices. The Client Area 1030 represents the portion of the Display Device 1010 that may be used to display one or more Browser Windows.

In the description below, it is generally assumed that the Local Computing Device 1010 and the Browser Application 1032/1033 communicate with the Remote Resource Page Server 1004 and Remote Application Data Server 1006 over the public internet, and therefore use standard and conventional protocols for identifying, retrieving, and rendering the Resource Page 1016 and Data, including Resource Data of the Resource Data Set 1026, e.g., from a web server represented by the Remote Resource Page Server 1004 and from a Remote Application Data Server 1006. However, it will be appreciated that such examples are provided merely for the sake of clarity and conciseness, and are not intended to be limiting of the different ways in which the Local Computing Device 1002 may identify, retrieve, render, or display Resource Pages and Data, including Resource Data, in association with the Browser Application 1032/1033, Browser Window 1012/1013, and Tab 1014/1015.

In this description, it may generally be assumed that the Resource Page 1016 represents any of the many types of Hosted Information Resources in the form of webpages that are available over the public internet. For example, the Resource Page 1016 may represent a substantially static page that includes text, sound, images, or other content which may be displayed within the Browser Window 1012/1013. In other examples, the Resource Page 1016 may include different types of dynamic or interactive content that can be engaged and manipulated by the user within the context of the Browser Window 1012/1013. In many instances, the Resource Page 1016 and/or associated executable code may be understood to represent an application which may execute partially or completely at the Remote Resource Page Server 1004 (e.g., may utilize the processor, memory, and other hardware/software resources of the Remote Resource Page Server 1004), while providing associated functionality and features to the user via the Browser Window 1012 (and perhaps executing at least partially locally at the Local Computing Device 1002). As just referenced, such Hosted Information Resources in the form of webpages and associated functionalities and applications are well-known to be implementable using various, conventional programming languages and techniques including hypertext markup language (HTML), Asynchronous JavaScript (AJAX), Extensible Markup Language (XML), JavaScript, JavaScript Object Notation (JSON), and many other types of code which may be executed.

In FIGS. 1 and 2, the Resource Page 1016 at the Remote Resource Page Server 1004 is illustrated as including, or being associated with, a Page Model 1034 and a Page Script 1036. The use of such a Page Model 1034 and Page Script 1036 is known to and would be readily apparent to one of skill in the art and as such is not described in detail herein.

During a conventional rendering of the Resource Page 1016 by the Browser Application 1032/1033, a Temporary Memory 1038*a*, (e.g., a cache memory) at the Local Computing Device 1002 may be used to store temporarily the Page Model 1034 and the Page Script 1036. This, however, is meant to provide a non-limiting example, and it may be appreciated that the Browser Application 1032/1033 may partially or completely access the Page Model 1034 and/or the Page Script 1036 remotely at the Remote Resource Page Server 1004. In this way, the Browser Application 1032/1033 may utilize the Page Model 1034 and the Page Script 1036, e.g., in a conventional manner, so as to thereby render the Resource Page 1016 within the Browser Window 1012/1013 provided by the Browser Application 1032/1033.

Similarly, and as implied by system 1000/1001, Application Data, including a Resource Data Set, may be downloaded from its Remote Application Data Server 1006 to the Local Computing Device 1002 and stored in Temporary Memory 1038*b* for use by the Application Controller 1040/1041 (described in detail below). However, it may be appreciated that there are other possible ways with which Application Data, including Resource Data, can be made accessible to the Application Controller 1040/1041. For example, Resource Data can be created and stored locally and then shifted to temporary memory for use by the Application Controller 1040/1041. Also, locally stored Resource Data can be combined with the Resource Data Set 1026 initially stored at Remote Application Data Server 1006; this combination can then be stored in temporary memory as a larger Resource Data Set for use by the Application Controller 1040/1041.

The Application Controller 1040/1041, in coordination with the Application UI Controller 1042/1043 and Other Files 1044/1045, provides that each Resource Page and/or Resource Page Selection is rendered alongside its specific Resource Data as a Resource displayed in a Browser Window 1012/1013; thus, the Application Controller 1040/1041 may be thought of as what links the files on Remote Resource Page Server 1004 with the Resource Data files on Remote Application Data Server 1006. The Application Controller 1040/1041, in coordination with the Application UI Controller 1042/1043 and Other Files 1044/1045 also provide the basis for combining the ordinary/traditional functions of a Browser Application and Display Device to create visual and functional relationships between Resources; thus, the Application Controller 1040/1041 also may be thought of as what links one independent Resource to another. An application controller may generally represent a set of (message or event) handlers and/or the application's associated business logic and other data elements.

As implied above, an AUI Controller's 1042/1043 functions often fall between the AUI and the Application Controller 1040/1041. These functions may include but are not limited to some or all of the following: 1) convey AUI inputs to Application Controller 1040/1041 which the Application Controller can interpret to build the Application UI View State and Resource Data Message corresponding to the inputs to the AUI; 2) inform the Application Controller 1040/1041 it is ready to receive the Application UI View State and Resource Data Message; 3) receive the Application UI View State and Resource Data Message; and 4) interpret and execute the tasks of the Application UI View State and Resource Data Message, ultimately resulting in the display of one or more AUIs in one or more Rendered Views of one or more tabs of one or more Browser Windows 1012/1013. Application UI View State and Resource Data Message may be one or more messages containing an Application UI View State, Resource Data, and/or instructions useful for execution and display of a specific AUI by the AUI Controller. The Application UI View State and Resource Data Message may come in several forms including but not limited to the Dynamic Navigation UI View State and Resource Data Message. A Dynamic Navigation UI View State and Resource Data Message may be one or more messages containing the Dynamic Navigation UI View State, Resource Data, and/or instructions useful for execution and display of a Resource specific DNUI by the AUI Controller. The Dynamic Navigation UI View State and Resource Data Message is an example of an Application UI View State and Resource Data Message. The Dynamic Navigation UI View State and Resource Data Message is central to multiple implementations of the RSNP. How it can be used is described in detail below.

The AUI Controller 1042/1043, respectively may represent more than one AUI Controller. For example, for the descriptions and figures of system 1000 AUI Controller 1042 may represent multiple AUI Controllers including but not limited to an AUI Controller for one or more tabs. Likewise, for the descriptions and figures of system 1001 AUI Controller 1043 may represent multiple AUI Controllers including but not limited to an AUI Controller for each Rendered View of a Browser Window.

A shared Configuration File 1046/1047 and Other Files 1044/1045 are useful to support many implementations of the RSNP. Other Files 1044/1045 may include but are not limited to the following file types: HTML files, JSON files, cascading style sheets (CSS) files, JavaScript files, image files, audio files, and text files.

As implied by system 1000/1001, the Application Controller 1040/1041, the AUI Controller 1042/1043, and Other Files 1044/1045 provide functionality to the Browser Application 1032/1033. The Application Controller 1040/1041, AUI Controller 1042/1042, and Other Files 1044/1045 can do so either by being directly incorporated into the Browser Application 1032/1033 or by being made available for use by the Browser Application as a set of files that provide additional features or functionalities in association with the Browser Application. In system 1000/1001, these files are shown as the Extension Files 1048/1049 but may as may be understood from the more detailed description below, or as would be apparent to one of skill in the art, generally refer to browser extensions, add-ons, active X controls, web applications (web apps, apps) or any other program code which is designed to augment an appearance or functionality of the Browser Application 1032/1033 in providing the Browser Window 1012/1013 and page and elements rendered within it. The Background Page 1050/1051, Content Script File(s) 1052/1053, and Other Files 1054/1055 are outlined with a dotted line and connected with dashed lines to the Application Controller 1040/1041, AUI Controller 1042/1043, and Other Files 1044/1045 respectively, to indicate that the Background Page 1050/1051, Content Script File(s) 1052/1053, and Other Files 1054/1055 provide functions similar to the functional components with which each is connected by the dashed lines in an alternative implementation of system 1000/1001. That is, in the latter alternative arrangement and implementation, the Background Page 1050/1051 would fulfill one or more functions of the Application Controller 1040/1041; Content Script File(s) 1052/1053 would fulfill one or more functions of the AUI Controller 1042/1043; and the Other Files 1054/1055 would fulfill one or more functions of the Other Files 1044/1045. The Manifest File 1056/1057 is outlined with a dotted line and connected with dashed lines to the Configuration File 1046/1047, to indicate that the Manifest File 1056/1057 can provide an alternative arrangement to and implementation of part or all of Configuration File 1046/1047. That is, in the latter alternative arrangement and implementation, some or all functions of the Configuration File 1046/1047 may be embodied in the Manifest File 1056/1057.

As described herein, the Extension Files 1048/1049 may be utilized in the system 1000/1001 to provide additional features or functionalities in association with the Browser Application 1032/1033, and thus with respect to the Browser Window 1032/1033. In the example of system 1000/1001, an Extension Icon 1058/1059 represents an icon that is provided in conjunction with the Browser Application 1032/1033. The Extension Icon 1058/1059 may be produced by, or in conjunction with, the various Extension Files 1048/1049.

As would be understood by one of skill in the art, a browser extension generated by the Extension Files 1048/1049 may generally refer to a browser extension, add-on, active X control, web applications (web app, app) or any other program code which is designed to augment an appearance or functionality of the Browser Application 1032/1033 in providing the Browser Window 1012/1013 and page and elements rendered within it. As such, the Extension Files 1048/1049 may include one or more of various types of files, such as, for example, HTML files, JSON files, CSS files, JavaScript files, image files, audio files, text files, or another type of code or content that may be used to extend the features and functionalities provided by the Browser Application 1032/1033.

Some or all of the Extension Files 1048/1049 may be understood to be virtually indistinguishable in appearance, structure, and function with respect to otherwise conventional webpages which might be rendered by the Browser Application 1032/1033. Such files can use all the functionality of the Browser Application 1032/1033 with respect to the rendering of webpages. For example, those Extension Files 1048/1049 virtually indistinguishable in appearance, structure, and function with respect to otherwise conventional webpages may use the various application program interfaces (APIs) that the Browser Application 1032/1033 provides to external webpages such as Resource Page 1016.

In additional examples of the Extension Files 1048/1049, an associated extension may provide functionality to the Browser Application 1032/1033, such as a browser action to be implemented by the Browser Application 1032/1033 when the extension in question is relevant to most or all pages to be rendered by the Browser Application 1032/1033 within the Browser Window 1012/1013.

Thus, with respect to the simplified example of the system 1000/1001, a browser action of the Extension Files 1048/1049 may cause the Extension Icon 1058/1059 to appear within the Browser Window 1012/1013 essentially independently of the Resource Page 1016. Further, as is known, other extension functions may be implemented automatically in conjunction with an operation of the Browser Application 1032/1033, e.g., in conjunction with the loading and rendering of the Resource Page 1016. Further, as is known, other extension functions may be implemented programmatically. That is, for example, an extension may be configured to execute in a manner that is dependent upon a user's selection of a feature of the Browser Application 1032/1033. An extension also may be configured so that can it can add multiple functions to the Browser Application 1032/1033 by utilizing one or more of the implementations described above. For example, an extension may be configured so that it executes one or more of these functions automatically and one or more of these functions programmatically. Such an example is described in detail in the figures and text below.

In the simplified example of the system 1000/1001, the Extension Files 1048/1049 are illustrated as being stored locally to the Local Computing Device 1002. For example, a user of the Local Computing Device 1002 may program and store the Extension Files 1048/1049 for use by the Browser Application 1032/1033. In additional or alternative examples, however, it may be appreciated that some or all of the Extension Files 1048/1049 may be accessed remotely. For example, a particular extension may be packaged within a single folder or archive that may then be accessed by the Browser Application 1032/1033. For example, a provider and/or distributor of the Extension Files 1048/1049 (not specifically illustrated in the example of system 1001/1001) may construct and package the Extension Files 1048/1049, and a user of the system 1000/1001 may thereby download and install a desired extension, including accessing, downloading, and installing the Extension Files 1048/1049 at the Local Computing Device 1002, as shown.

As mentioned, the Extension Files 1048/1049 include various different types of files. For example, the Extension Files 1048/1049 may include a Manifest file 1056/1057 which contains information about the extension, such as, its most important files and capabilities and provides configuration information to the Browser Application 1032/1033 that will affect the behavior of the extension at runtime. In another example, as illustrated in the example system 1000/1001, the Extension Files 1048/1049 may include a background file or background page, commonly an HTML page, which is generally known to represent an invisible page which holds the main logic of the extension, and which may thus run in the background so as to be always-available in case of some initiation of a relevant extension action. In system 1000/1001, the Background Page 1050/1051 fulfills this function (and other functions) and by doing so, fulfills the role of Application Controller 1040/1041 when provided. For example, for an extension installed on the Local Computing Device 1002 that includes the Extension Files 1048/1049, a browser action may be defined to have some affect on the rendering of the Resource Page 1016 via the Browser Window 1012/1013. Thus, the Extension Icon 1058/1059 may represent or be associated with such a browser action, and the associated Background Page 1050/1051 may be defined by an HTML file which has JavaScript code that controls a behavior of the browser action associated with the Extension Icon 1058/1059.

It may be appreciated that the Extension Files 1048/1049 may include various other types of files as well. For example, the Extension Files 1048/1049 may include other types of HTML pages, such as, for example, an HTML page associated with the browser action providing a pop-up window in association with the Browser Window 1012/1013. These may work in coordination with an AUI to provide some of the functions of the Extension Files 1048/1049. Thus, as described, HTML pages and associated code within the Extension Files 1048/1049 may include a background page associated with the Background Page 1050/1051, as well as a pop-up page associated with a corresponding pop-up file (not specifically illustrated in the example of system 1000/1001).

As illustrated in the example of system 1000/1001, and as referenced above, the Extension Files 1048/1049 may include, or be associated with Content Script File(s) 1052/1053 which would provide functions of the AUI Controllers 1042/1043. As is known, the Content Script File(s) 1052/1053 may represent, or include, one or more content scripts that enable an associated extension to interact with webpages, e.g., the Resource Page 1016. For example, the content script or content scripts of the Content Script File(s) 1052/1053 may be implemented as JavaScript that executes in the context of a Resource Page 1016 as loaded into the Browser Application 1032/1033. Therefore, the content script or content scripts of the Content Script File(s) 1052/1053 may be considered effectually part of a loaded page, instead of being considered part of an extension with which the content script or content scripts of the Content Script File(s) 1052/1053 was packaged.

Content scripts, generally speaking, may be configured to, for example, read details of webpages visited by the Browser Application 1032/1033, and may be further configured to make changes to such pages. For example, a content script may be configured to read and/or modify the Page Model (e.g., DOM) 1034 of a Resource Page 1036. The specific process for this is known to and would be readily apparent to one of skill in the art and as such is not described in detail herein.

Figure 5:
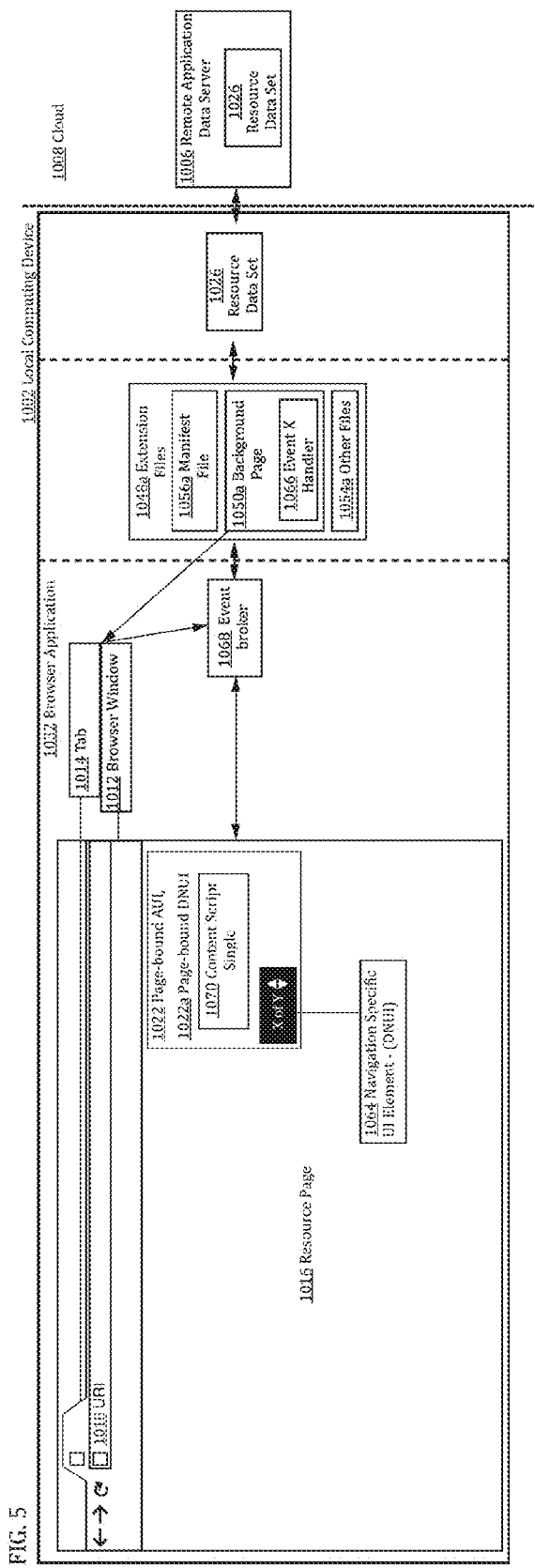
FIG. 5 is a block diagram illustrating a first example embodiment of user interface components and functional modules for implementing a page-bound dynamic navigation user interface.
Figure 6:
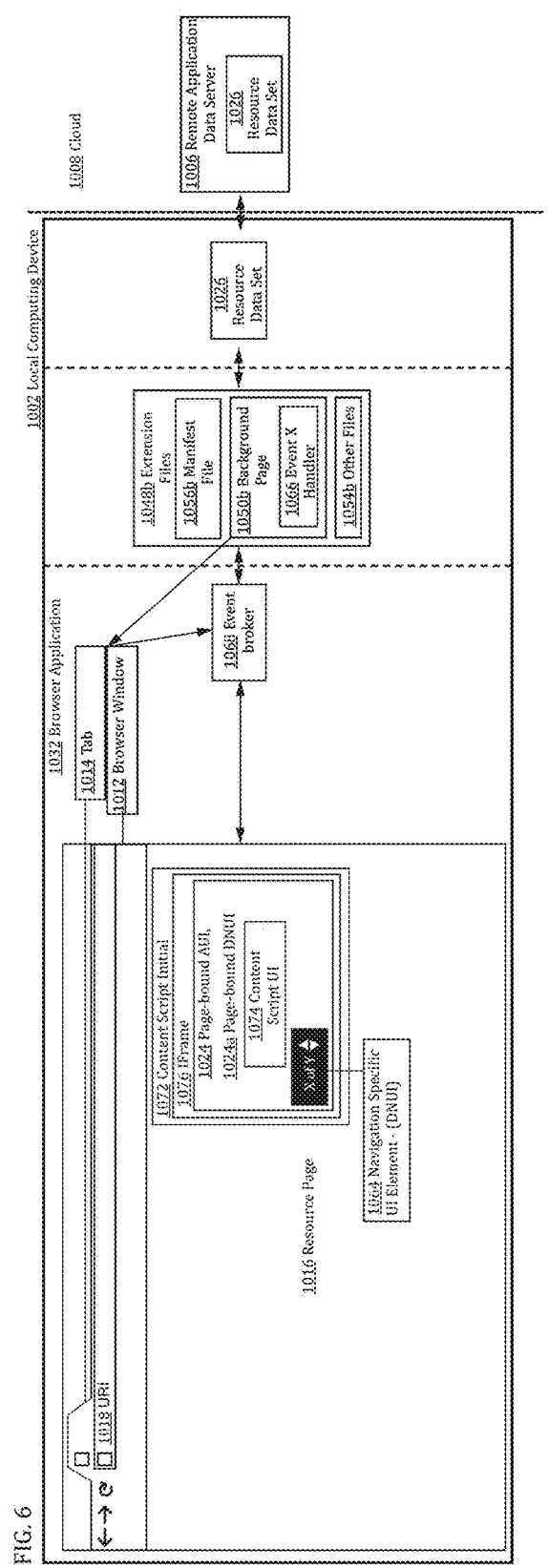
FIG. 6 is a block diagram illustrating a second example embodiment of user interface components and functional modules for implementing a page-bound dynamic navigation user interface.

As described in detail herein, the content script or content scripts of the Content Script File(s) 1052/1053 may be enabled to communicate with the Background Page 1050 of the relevant Extension Files 1048/1049 or with other files/pages associated with the Extension Files 1048/1049. For example, as described in detail or implied below with respect to FIGS. 5 and 6 the content script or content scripts of the Content Script File(s) 1052 may be enabled to exchange messages with an associated Background Page 1050. For example, the content script or content scripts of the Content Script File(s) 1052/1053 might send such messages to the associated Background Page 1050/1051 in response to some detected event. Additionally, the associated Background Page 1050/1051 may be enabled to send a message to the content script or content scripts of the Content Script File(s) 1052/1053 to request the content script or content scripts to change the appearance of the relevant browser page, (e.g., the Resource Page 1016) in a desired manner. FIGS. 5, and 6 describe in detail the message exchange between the content script or content scripts of the Content Script File(s) 1052 and the associated Background Page 1050 and how it is used to result in the display of an AUI, including a Dynamic Navigation UI.

In more specific examples, the content script or content scripts of the Content Script File(s) 1052/1053 may include JavaScript files running in a context of a Resource Page 1016 being rendered. In some example implementations, such as those in FIGS. 5, and 6 the content script or content scripts of the Content Script File(s) 1052 should always, or by default, be injected into a Resource Page 1016 to be loaded. For example, such content script or content scripts of the Content Script File(s) 1052/1053 may be registered in the Manifest File 1056/1057 of Extension Files 1048/1049 with the corresponding extension. Further, it may be appreciated that a given extension may be configured to insert multiple content scripts into a Resource Page 1016 during the rendering thereof, where each such content script may have multiple JavaScripts, or other types of content script content.

In the example of system 1000/1001, the Local Computer Device 1002 is illustrated as including at least one processor 1060, as well as a non-transitory Computer Readable Storage Medium 1062. That is, for example, the Local Computing Device 1002 may rely on two or more processors executing in parallel to achieve a desired result. Meanwhile, the non-transitory Computer Readable Storage Medium 1062 may represent any conventional type of computer memory which may be used, for example, to store instructions which, when executed by the at least one processor 1060, cause the Browser Application 1032/1033 and/or other components of the Local Computing Device 1002 and the Display Device 1010 to perform various functions, including other relevant functions described herein and the processes described below. Additional or alternative example implementations of the system 1000/1001 are described herein, or would be apparent to one of skill in the art.

The Servers 1004, 1006 may similarly comprise at least one processor and a non-transitory computer readable storage medium that stores instructions that when executed by the at least one processor causes the at least one processor to perform the functions attributed to the respective Servers 1004, 1006 described herein.

In the examples of FIGS. 1, 2, 3, 4, 5, and 6 the elements are illustrated including discrete functional modules. However, it may be appreciated that such illustration is merely for the sake of example, and that other implementations are possible. For example, a single element of the Browser Application 1032/1033 may be implemented by two or more elements. Conversely, two or more components of the Browser Application 1032/1033 may be executed using a single component. The Application Controller 1040/1041 and its embodiment in a Background Page may access these components and may contain or directly access several sub-components, functions, and data structures not explicitly shown in system 1000/1001.

FIG. 3 is a diagram illustrating a non-limiting example of the components and messaging processes for an implementation of the RSNP using a Browser-bound DNUI 1020a. In this example, the Browser-bound DNUI 1020a is shown directly incorporated into the Browser Window 1012 of Display Device 1010 rather than in the Resource Page 1016 displayed in Browser Window 1012. The positioning of the Browser-bound DNUI 1020 in the top-right corner of the Browser Window 1012, thus overlapping what would otherwise be the top-right corner of Resource Page 1016 area, is merely for the sake of example and other implementations, positioning, sizing, configurations, etc. are possible. For a non-limiting example, with slight modification of system 1000 components, the AUI represented in these figures as a Browser-bound DNUI 1020*a* could be made to display and behave as a Page-bound DNUI 1022 or 1024.

Once a Resource Page 1016 has been recognized as part of a Resource Set, the Browser-bound AUI 1020, in the form of the Browser-bound DNUI 1020*a*, may serve as both the starting and ending point of the Resource Set Navigation Process (RSNP). The steps between Resource Page rendering and recognition as part of a Resource Set are described in detail in the flowcharts of FIGS. 10 and 12. The start of the process may begin with the explicit representation on the Browser-bound DNUI 1020*a* of the current Resource Page's 1016 place within the scope and sequence of the Resource Set of which the Resource Page is a part. Navigation Specific UI Elements 1064 on the Browser-bound DNUI 1020*a*, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown. In this example the "X" represents the displayed Resource's order within the numbered scope of the Resource Set of which the Resource is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards and backwards, through the entire scope of the Resource Set. Upon selection of the Navigation Specific UI Element 1064 the AUI Controller 1042*a* receives an indication of the event. The AUI Controller 1042*a* then messages the Application Controller's 1040*a* Event X Handler 1066 (Navigate Handler) through the Event Broker 1068 indicating a target Resource that the Browser should display based on the selection of the Navigation Specific UI Element 1064. A Navigate Handler may comprise one or more handlers that receives the Navigate Message to continue the RSNP. There may be more specific kinds of Navigate Handlers that may affect a specific kind of navigation. For example, to affect a navigation from a single Resource to another within the same Resource Set, a Navigate to Resource Message may be published for receipt by a Navigate to Resource Handler; to affect a navigation from a Resource Set to a different Resource Set, a Navigate to Resource Set Message may be published for receipt by a Navigate to Resource Set Handler. The Event Broker 1068 can represent the Browser Application 1032 messaging API. Upon receiving an indication of the message (Navigate Message), the Application Controller 1040*a* changes document URI to that of the target Resource's Resource Page 1016 intended for display in the target tab. A Navigate Message may be one or more messages 1) published upon selection of a Navigation Specific UI Element and/or initiating the RSNP; and 2) containing the information indicating the Resource and/or Resource Set to which the Browser Application should navigate and, if needed, the Rendered View or Rendered Views and/or tab or tabs in which to affect the navigation. There may be more specific kinds of Navigate Messages that may affect a specific kind of navigation. For example, to affect a navigation from a single Resource to another within the same Resource Set, a Navigate to Resource Message may used; to affect a navigation from a Resource Set to a different Resource Set, a Navigate to Resource Set Message may used. The Application Controller 1040*a* retrieves from the Resource Data Set 1026 the Resource Data sufficient to display the intended Resource. The Application Controller 1040*a* sends the Dynamic Navigation UI View State and Resource Data Message to the AUI Controller 1042*a* through the Event Broker ultimately resulting in the display of the target Resource's Resource Page 1016 alongside its Browser-bound DNUI 1020*a*. The process can begin again with the selection of the Navigation Specific UI Element 1064. The process discussed above is shown in detail in a flowchart in FIGS. 10 and 12.

FIG. 4 shows a non-limiting example of how, with slight modification, the configuration, components, and messaging system of system 1000 in FIG. 3 may conform to those of system 1001. The primary difference between the two configurations, components, and messaging systems is the layer necessary to manage one or more Rendered Views 1017 simultaneously displayed within a single Browser Window as shown in FIG. 4. As represented by the single directional arrow from Rendered View 1017 to the Event Broker 1069 the Rendered View 1017 may pass Rendered View Events through Event Broker 1069 to the Application Controller 1041*a*. However, the Rendered View Event messages may also be passed from the Rendered View 1017 to the Application Controller 1041*a* through the Application UI Controller 1043*a* before the Event Broker 1069. Other communication between each Rendered View 1017, its associated Resource Page 1016, and Resource Page 1016's associated AUI with the Application Controller 1041*a* may go through the Application UI Controller 1043*a*. As noted in the Definitions and description herein, the Application UI Controller 1042 and 1043 may exist in multiple instances. These figures are provided for the sake of clarity and do not imply that the functional components and their respective functions must exist as a single logical structure or in the locations and components shown in these diagrams.

FIG. 5 is a diagram illustrating a non-limiting example of the components and messaging processes for an implementation of the RSNP using a Page-bound DNUI 1022*a*. In this example, the Page-Bound AUI 1022 is shown directly incorporated into the Resource Page 1016 displayed in Browser Window 212 of Display Device 1010. The positioning of the Page-Bound AUI 1022 in the top-right corner of the Resource Page 1016 is merely for the sake of example and other implementations, positioning, sizing, configurations, etc. are possible. For example, the Page-Bound AUI 1022 can be made movable, so that it can be moved to any location on the Resource Page 1016. The process and arrangement of functional components desirable to use the Page-Bound AUI 1022 in the RSNP are much the same as those desirable to use the Browser-bound AUI 1020 in the RSNP. However, as shown in the diagram, the AUI Controller is embodied by and inserted directly into the Resource Page 1016 as Content Script Single 1070. As a result, the Content Script Single 1070 must be inserted into each Resource Page of a Resource Set when the Resource Page is initially rendered.

Once a Resource Page 1016 has been recognized as part of a Resource Set, the Page-Bound AUI 1022, in the form of the Page-bound DNUI 1022*a*, may serve as both the starting and ending point of the Resource Set Navigation Process (RSNP). The steps between Resource Page rendering and recognition as part of a Resource set are described in detail in the flowchart of FIGS. 13A-C. The start of the process may begin with the explicit representation on the Page-Bound DNUI 1022*a* of the current Resource Page's 1016 place within the scope and sequence of the Resource Set of which the Resource Page is a part. Navigation Specific UI Elements on the Page-Bound DNUI 1022*a*, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown in FIG. 5. In this example the "X" represents the displayed Resource's order within the numbered scope of the Resource Set of which the Resource Set is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards and backwards, through the entire scope of the Resource Set. Upon selection of the Navigation Specific UI Element 1064 the Content Script Single 1070 receives an indication of the event. The Content Script Single 1070 then messages the Background Page's 1050*a* Event X Handler (Navigate Handler) 1066 through the Event Broker 1068 indicating a target Resource to which the Browser should navigate based on the selection of the Navigation Specific UI Element 1064. The Event Broker 1068 represents the Browser Application 1032 messaging API. Upon receiving an indication of the message (Navigate Message), the Background Page 1050*a* changes the document URI to that of the target Resource's Resource Page 1016 intended for display in the target tab. The Background Page 1050*a* retrieves from the Resource Data Set 1026 the Resource Data to display the intended Resource. The Browser Application 1032 injects a Content Script Single 1070 into the Resource Page 1016. The Background Page 1050*a* also sends the Dynamic Navigation UI View State and Resource Data Message to the Content Script Single 1070 through the Event Broker ultimately resulting in the display of the target Resource's Resource Page 1016 with its Page-Bound DNUI 1022*a*. The process can begin again with the selection of the Navigation Specific UI Element 1064. The entirety of the process discussed above is shown in detail in a flowchart in FIGS. 13A-C.

FIG. 6 is a diagram illustrating a non-limiting example of the components and messaging processes for an implementation of the RSNP using a Page-bound DNUI 1024*a*. In this example, the Page-bound AUI 1024 is shown directly incorporated into the Resource Page 1016 displayed in Browser Window 1012 of Display Device 1010. The positioning of the Page-bound AUI 1024 in the top-right corner of the Resource Page 1016 is merely for the sake of example and other implementations, positioning, sizing, configurations, etc. are possible. For example, the Page-bound AUI 1024 can be made movable, so that it can be moved to any location on the Resource Page 1016. The process and arrangement of functional components desirable to use the Page-bound AUI 1024 in the RSNP are much the same as those desirable to use the Browser-bound AUI 1020 in the RSNP. However, as shown in the diagram, the AUI Controller functions are carried out by Content Script Initial 1072, a content script that has been inserted into Resource Page 1016 and Content Script UI 1074, a content script that has been encapsulated in an IFrame 1076 that has been inserted into Resource Page 1016. As a result, the Content Script UI 1074 and Content Script Initial 1072 may be inserted into each Resource Page of a Resource Set when the Resource Page is initially rendered.

Once a Resource Page 1016 has been recognized as part of a Resource Set, the Page-bound AUI 1024, in the form of the Page-bound DNUI 1024*a*, may serve as both the starting and ending point of the Resource Set Navigation Process. The steps between Resource Page rendering and recognition as part of a Resource set are described in detail in the flowchart of FIGS. 15A-D. The start of the process may begin with the explicit representation on the Page-bound DNUI of the current Resource Page's 1016 place within the scope and sequence of the Resource Set of which the Resource Page is a part. Navigation Specific UI Elements on the Page-bound DNUI, such as a directional arrows or buttons indicating the sequence such as "Next" and "Previous", are displayed in order to provide the means with which one or more Resources in the Resource Set can be accessed according to the Resource Set's creator's intended scope and sequence. One possible example of such a Navigation Specific UI Element 1064 is shown in FIG. 6. In this example the "X" represents the displayed Resource's order within the numbered scope of the Resource Set of which the Resource Set is a part. For example, if the displayed Resource is the third resource within a Resource Set of five Resources, the "X" will be "3" and the "Y" will be "5". The arrows to the right of "X" and "Y" allow the user to access a next Resource with the Resource Set in a single click; this element can be displayed in the same place for each Resource and thus serve as a single point of selection to navigate sequentially, forwards and backwards, through the entire scope of the Resource Set. Upon selection of the Navigation Specific UI Element 1064 the Content Script UI 1074 receives an indication of the event. The Content Script UI 1074 then messages the Background Page's 1050*b* Event X Handler (Navigate Handler) 1066 through the Event Broker 1068 indicating a target Resource to which the Browser should navigate based on the selection of the Navigation Specific UI Element 1064. The Event Broker 1068 represents the Browser Application 1032 messaging API. Upon receiving the indication of the message (Navigate Message), the Background Page 1050*b* changes the document URI to that of the target Resource's Resource Page intended for display in the target tab. The Background Page 1050*b* retrieves from the Resource Data Set 1026 the Resource Data sufficient to display the intended Resource. The Browser Application 1032 injects a Content Script Initial 1072 into the Resource Page 1016. This action results in the addition of a Content Script UI 1074 encapsulated in an IFrame 1076 in the Resource Page 1016. The Background Page 1050*b* publishes the Dynamic Navigation UI View State and Resource Data Message. The Content Script Initial 1072 and Content Script UI 1074 receive the message, ultimately resulting in the display of the target Resource's Resource Page 1016 with its Page-bound DNUI 1024*a*. The process can begin again with the selection of the Navigation Specific UI Element 1064. The entirety of the process discussed above is shown in detail in a flowchart in FIGS. 15A-D.

Figure 7:
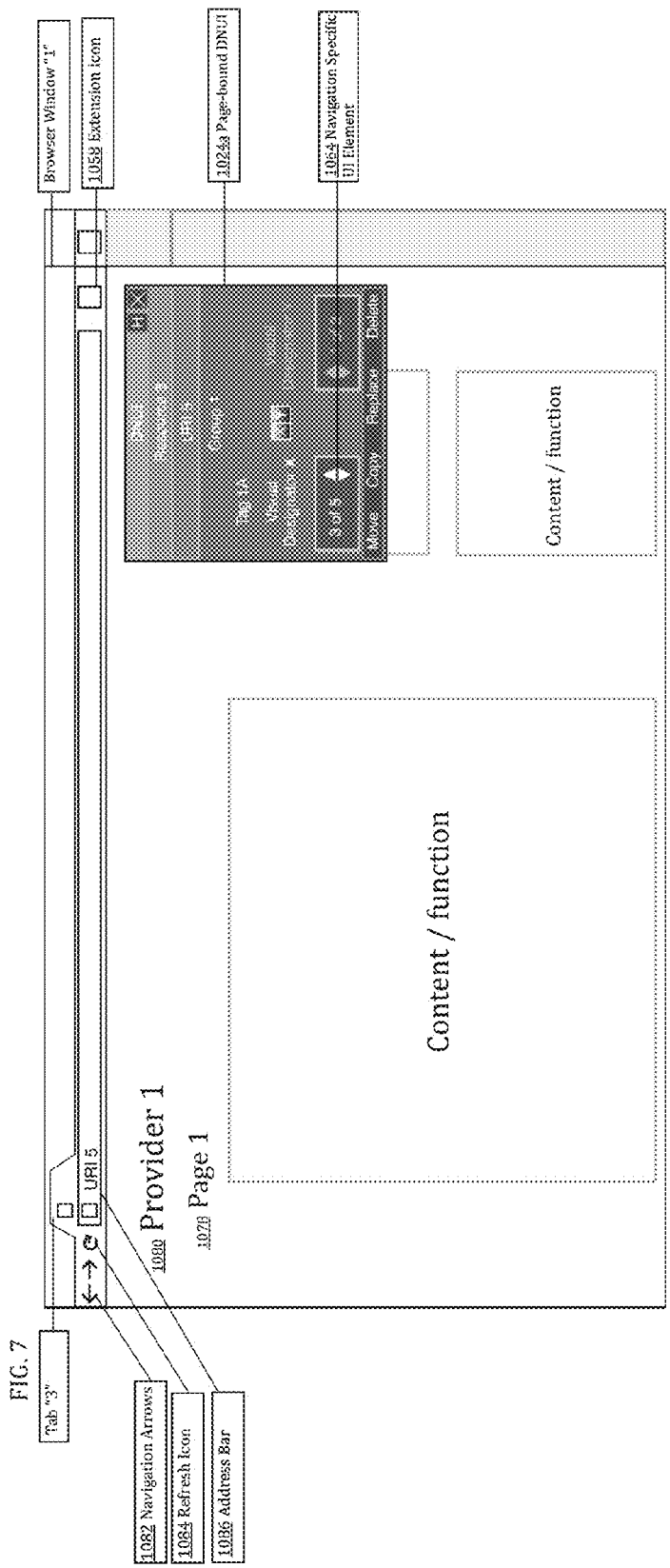
FIG. 7 is a block diagram illustrating a first example embodiment of user interface components and functional modules for implementing a page-bound dynamic navigation user interface utilizing extension files.

FIG. 7 is a diagram illustrating a detailed example implementation of the Page-bound DNUI 1024*a* utilizing the system 1000 Extension Files 1048*b*. Once a Resource Page has been recognized as part of a Resource Set, the Page-bound DNUI 1024*a* becomes both the starting and ending point of the RSNP. As shown in this example, the Page-bound DNUI 1024*a* displays some of the organizational and informational context of the Page 1 1078 with which it is displayed as a Resource; this context is Resource Data. For example "Resource 3" is the Resource title; "URI 5" is the URI of the Resource Page in view; "Group 1" refers to the Group of which the Resource is a part; "Tag 1A" is one of one or more tags with which the Resource has been tagged and defines a Sub-Group of which the Resource is a part; the container with "3 of 5" and a set of "up" "down" arrows is the Navigation Specific UI Element 1064; "Move", "Copy", "Replace", and "Delete" represent edit functions for both the Resource and Resource Set; the top right container showing "H" represents the ability to minimize the Page-bound DNUI 1024*a* without completely removing it from view; the top right container showing "X" represents the ability to remove the Page-bound DNUI 1024*a* from view. Herein, a Group may represent a Resource Set. Multiple Resource Sets may be derived from a Group using a traditional hierarchical folder structure or by multiple other methods including but not limited to utilizing "flatter" data structures based on associations that use tags to filter the Resources displayed within a Group to just those to which the tag or tags have been applied. A Sub-Group is a Resource Set that is composed of one or more of the Resources of a Group. A Sub-Group may be generated by multiple methods including but not limited to applying a tag or tags filter to a Group resulting in the display of only those Resources in the Group associated with the tag or tags applied to the filter. The resulting Resources displayed constitute a Sub-Group. A Sub-Group may be divided into additional Sub-Groups. The number of possible divisions is limited only by the number of Resources in the Group or Sub-Group from which additional Sub-Groups can be derived. Sub-Group is meant to describe any Sub-Group generated from either a Group or another Sub-Group.

The Tab "3" and Browser Window "1" represent the tab and browser associated with Resource 3. The Navigation Arrows 1082 represent standard browser navigation arrows allowing the user to reload previously viewed webpages. The Refresh Icon 1084 allows the user to refresh a rendered webpage. The Address Bar 1086 allows the user to enter and view the URI of any webpage or Resource Page displayed. The Extension Icon 1058 represents the extension icon of the Extension Files 1048*b*. In the description that follows, the Navigation Arrows 1082, Refresh Icon 1084, and Address Bar 1086, and Extension Icon 1058 may be used to initiate navigation functions referenced below.

The Page 1 1078 represents any webpage available on a computer network in its original browser rendering. Provider 1 1080 refers to the provider who has made the Page 1 1078 available on a computer network. The "Content/function" elements represent the fact that Page 1 1078 may contain content or functional elements of any size and located at any place within the Page 1 1078 as rendered in the Browser Window "1" 1012. As described above, a user can construct a presentation useful for pursuits such as education, business, travel, or other fields.

To provide context for the description in the preceding paragraphs, the following relates the information elements shown in FIG. 7 to those of a non-limiting "Education" example described throughout this disclosure. Here, Resource 3 could be the Resource Pages and Resource Data associated with a chapter from an eTextbook on Roman Engineering; URI 5 would correspond to the URI of the page of chapter of the eTextbook in view; Group 1 would be the subject or Group name Education; Tag 1A would be the tag/Sub-Group "Ancient Rome"; Page 1 1078 would be a Resource Page of the eTextbook chapter on Roman Engineering displayed in the Browser Window; the concept binding the Resource Pages of the chapter of the eTextbook on Roman Engineering and its associated Resource Data therefore would be the third out five Resources of the Resource Set defined by the subject/Group Education, and the tag/Sub-Group "Ancient Rome".

Figure 8:
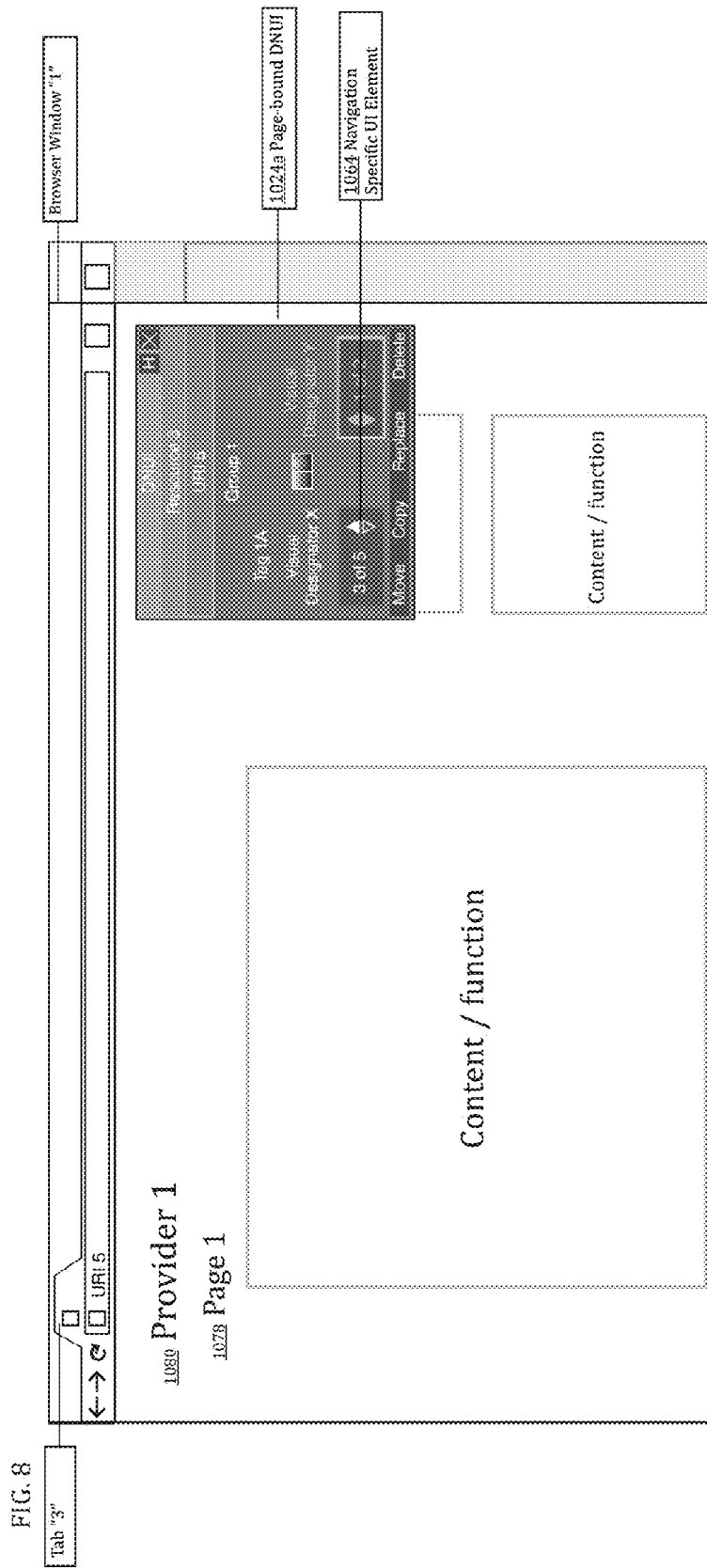
FIG. 8 is a block diagram illustrating a second example embodiment of user interface components and functional modules for implementing a page-bound dynamic navigation user interface utilizing extension files.

FIG. 8 is a diagram illustrating a detailed example implementation of the Page-bound DNUI 1024*a* utilizing the system 1000 Extension Files 1048*b* as discussed previously. In this figure, the Navigation Specific UI Element 1064 is shown with an outline to indicate that its "down" arrow has been selected and thus that an example of the RSNP, navigating from the third Resource to the fourth Resource within the Resource Set defined by the Group 1, and Sub-Group Tag-1A, has begun.

To provide context for the description in the preceding paragraphs, the following relates the information elements shown in FIG. 8 to those of the same non-limiting "Education" example described throughout this disclosure. For example, the user has selected a "down" arrow to navigate from the third Resource, the Resource Pages and Resource Data associated with an eTextbook chapter on Roman Engineering, to the fourth Resource of the same Resource Set defined by the subject/Group Education, and the tag/Sub-Group "Ancient Rome".

Figure 9:
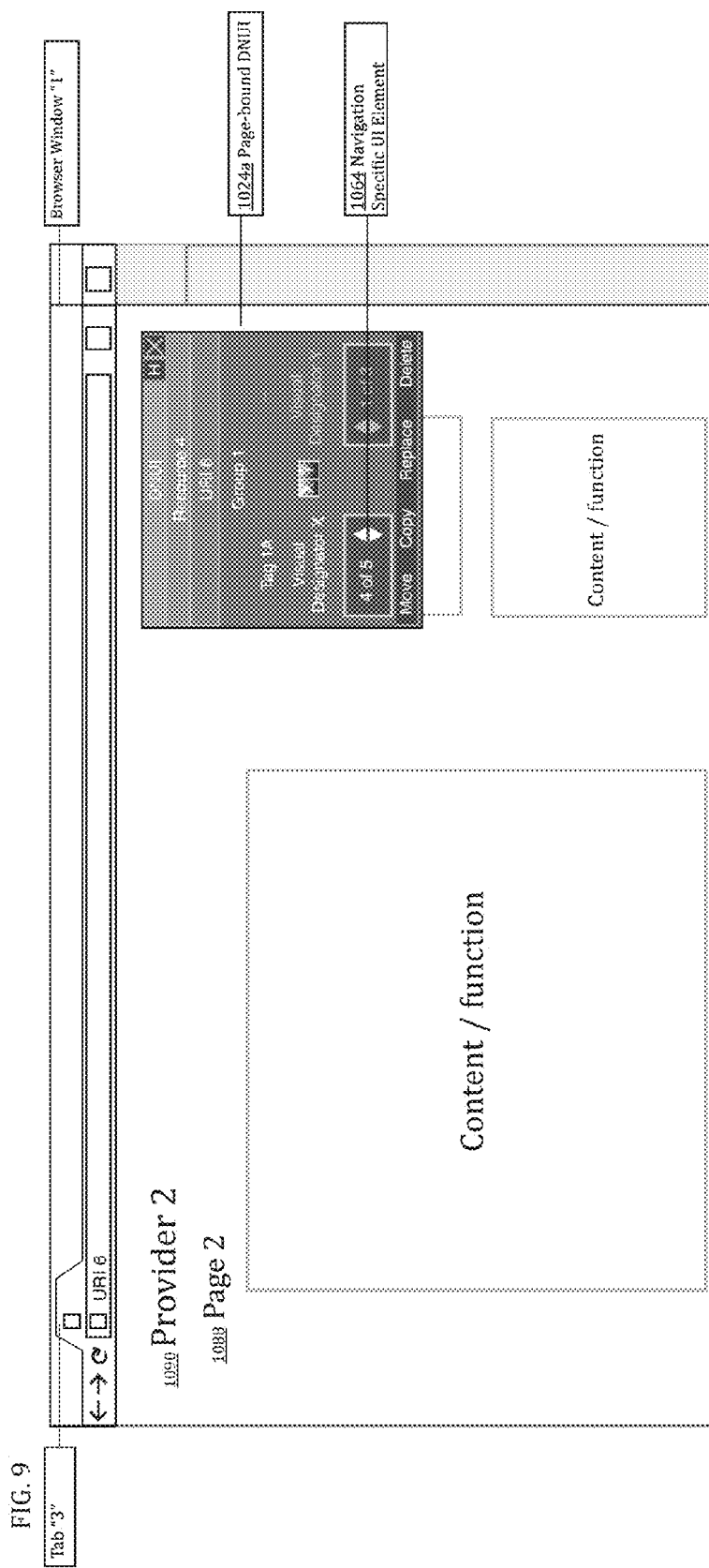
FIG. 9 is a block diagram illustrating a third example embodiment of user interface components and functional modules for implementing a page-bound dynamic navigation user interface utilizing extension files.

FIG. 9 is a diagram illustrating a detailed example implementation of the Page-bound DNUI 1024*a* utilizing the system 1000 Extension Files 1048*b* as discussed previously. FIG. 9 shows the example of the RSNP, navigating from the third Resource to the fourth Resource of the Resource Set defined by Group 1, and Sub-Group Tag-1A has completed.

As shown, Page-bound DNUI 1024*a* now displays the Resource Data of the new Resource Page 2 1088 with which it is displayed as Resource 4 of the Resource Set of "Group 1". As shown, "Resource 4" is the Resource title; "URI 6" is the URI of the Resource Page in view; "Group 1" refers to the Group of which the Resource is a part; "Tag 1A" is one of one or more tags with which the Resource has been tagged and defines a Sub-Group of which the Resource is a part; the container with "4 of 5" and a set of "up" "down" arrows is the Navigation Specific UI Element 1064;

The Resource Page 2 1088 represents any webpage available on a computer network in its original browser rendering. Provider 2 1090 refers to the provider who has made the Resource Page 2 1088 available on a computer network. The "Content/function" elements represent the fact that a Resource Page 2 1088 may contain content or functional elements of any size and located at any place within the Resource Page 2 1088 as rendered in the Browser Window "1" 1012.

To provide context for the description in the preceding paragraphs, the following relates the information elements shown in FIG. 9 to those of the same non-limiting "Education" example described throughout this disclosure. For example, the user has navigated from the third Resource, the Resource Pages and Resource Data associated with an eTextbook chapter on Roman Engineering, to the fourth Resource, an educational video on the Roman Forum, of the same Resource Set defined by the subject titled Education, and the tag of "Ancient Rome."

Resource 4 would be the an educational video on the Roman Forum; URI 6 would correspond to the URI of the an educational video on the Roman Forum; Group 1 would still be the subject name Education; Tag 1A would still be the tag/Sub-Group "Ancient Rome"; Resource Page 2 1088 would be a Resource Page of the an educational video on the Roman Forum displayed in the Browser Window "1" 1012; the an educational video on the Roman Forum therefore would occupy the fourth out five Resources of the Resource Set defined by the subject/Group Education, and the tag/Sub-Group "Ancient Rome".

Figure 10A:
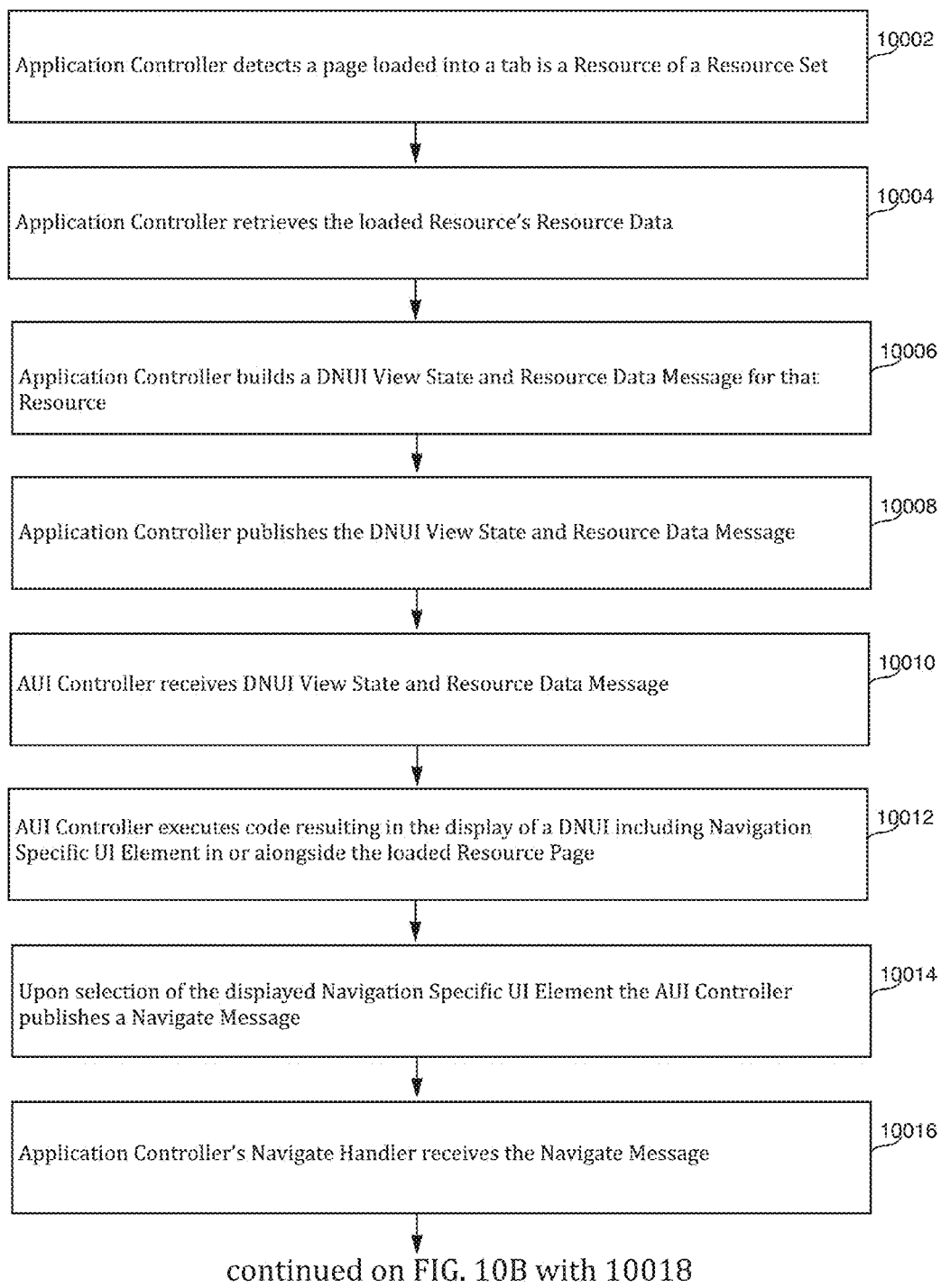
FIGS. 10A-10B are flowcharts illustrating an embodiment of a first process for navigating between digital resources using a dynamic navigation user interface.
Figure 10B:
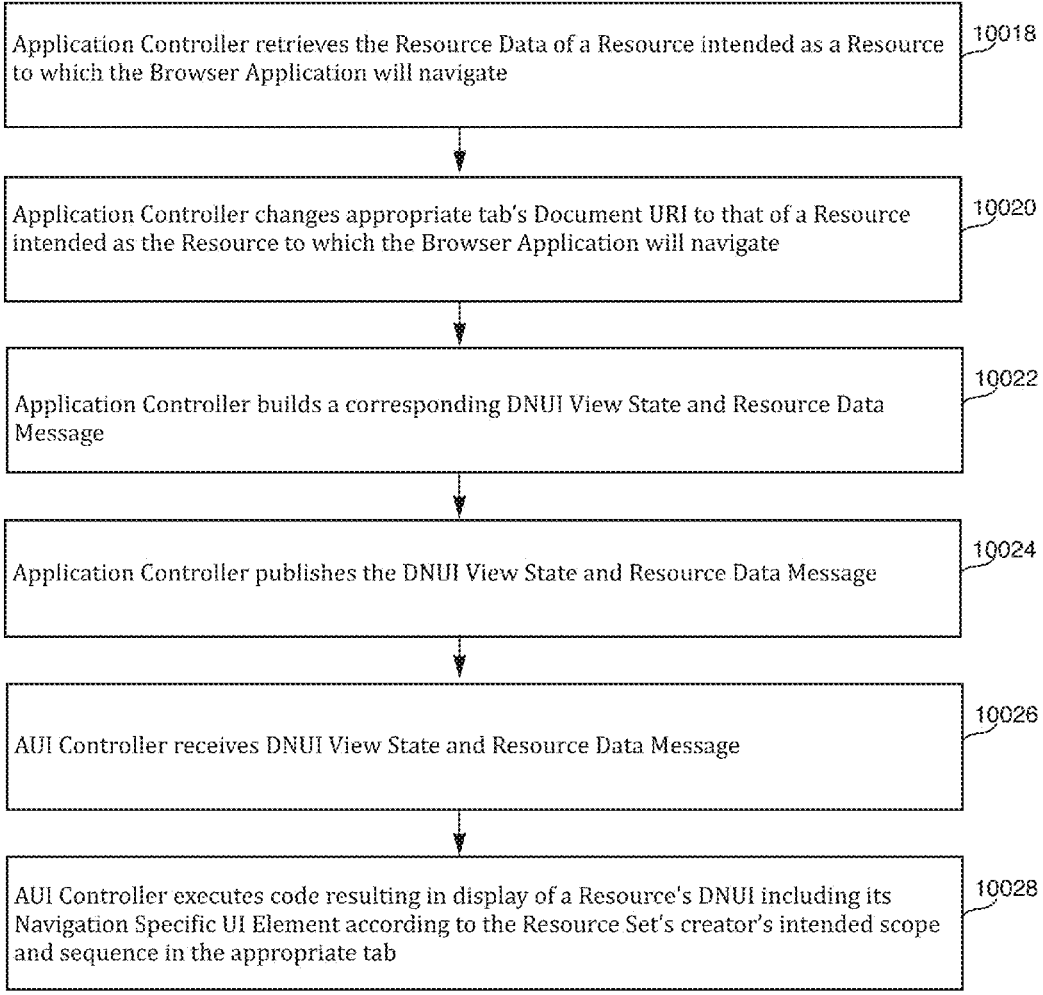

FIGS. 10A and 10B are flowcharts illustrating example operations of the system 1000 of FIG. 1 executing the RSNP, enablement of the repetitive selection of the same Navigation Specific UI Element in the Dynamic Navigation User Interface (DNUI) to result in the display of Resources in a Resource Set according to the Resource Set's creator's intended scope and sequence. In the example of FIGS. 10A and 10B operations (10002-10028) are illustrated as discrete operations occurring in a sequential manner. However, it may be appreciated that the operations (10002-10028) may execute in a partially or completely overlapping (e.g., parallel) manner. Further, the operations (10002-10028) may occur in an order different than that shown or may include additional or different operations not specifically illustrated with respect to 10A-10B. Further, it should be noted and as implied earlier in the description, several steps in these figures may be accomplished by a number of ways by varying the location of the data elements and degree of programmatic function of one or more steps. However, each step may be accomplished using the system 1000 components and data represented in the figures and description herein. More specific implementations are described in subsequent figures. In FIGS. 10A and 10B several basic operations are assumed to have taken place including but not limited to the initialization of the Browser Application 1032, initialization of the Application Controller 1040, and the loading of a page into a tab.

In the example of FIGS. 10A and 10B, in a first instance, the Application Controller detects a page loaded into a tab is a Resource of a Resource Set (10002). The Application Controller retrieves the loaded Resource's Resource Data (10004). The Application Controller builds a DNUI View State and Resource Data Message for that Resource (10006). The Application Controller publishes the DNUI View State and Resource Data Message (10008). An AUI Controller receives the DNUI View State and Resource Data Message (10010). An AUI Controller executes code resulting in the display of a DNUI including Navigation Specific UI Element in or alongside the loaded Resource Page (10012). Upon selection of the displayed Navigation Specific UI Element the AUI Controller publishes a Navigate Message (10014). The Application Controller receives the Navigate Message (10016). The Application Controller retrieves the Resource Data of a Resource intended as a Resource to which the Browser Application will navigate (10018). The Application Controller changes appropriate tab's Document URI to that of a Resource intended as the Resource to which the Browser Application will navigate (10020). The Application Controller builds a corresponding DNUI View State and Resource Data Message (10022). The Application Controller publishes the DNUI View State and Resource Data Message (10024). An AUI Controller receives the DNUI View State and Resource Data Message (10026). The AUI Controller executes code resulting in display of a Resource's DNUI including its Navigation Specific UI Element according to the Resource Set's creator's intended scope and sequence in the appropriate tab (10028).

Figure 11B:
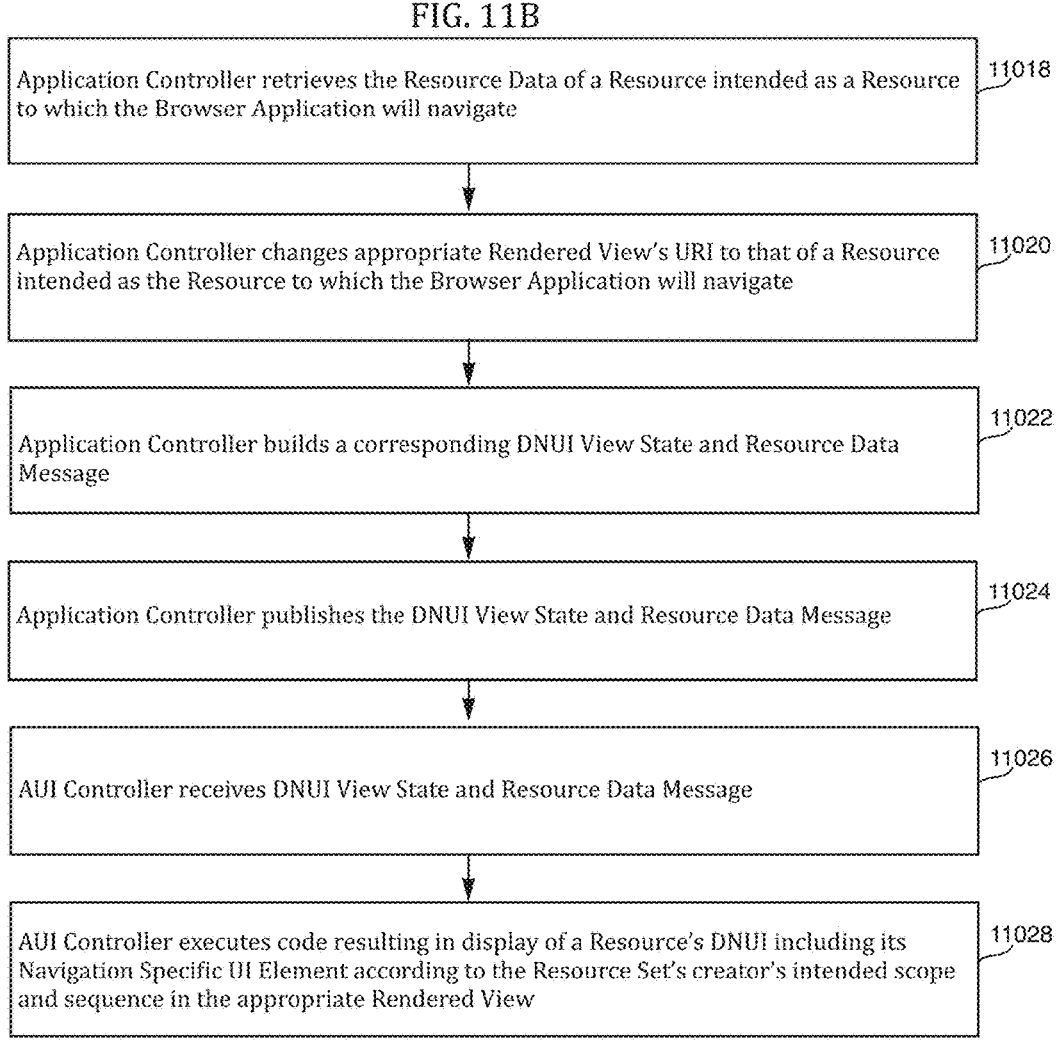

FIGS. 11A and 11B are flowcharts illustrating example operations of the system 1001 of FIG. 2 executing the RSNP, enablement of the repetitive selection of the same Navigation Specific UI Element in the Dynamic Navigation User Interface (DNUI) to result in the display of Resources in a Resource Set according to the Resource Set's creator's intended scope and sequence. In the example of FIGS. 11A and 11B operations (11002-11028) are illustrated as discrete operations occurring in a sequential manner. However, it may be appreciated that the operations (11002-11028) may execute in a partially or completely overlapping (e.g., parallel) manner. Further, the operations (11002-11028) may occur in an order different than that shown or may include additional or different operations not specifically illustrated with respect to 11A-11B. Further, it should be noted and as implied earlier in the description, several steps in these figures may be accomplished by a number of ways by varying the location of the data elements and degree of programmatic function of one or more steps. However, each step may be accomplished using the system 1001 components and data represented in the figures and description herein. More specific implementations are described in subsequent figures. In FIGS. 11A and 11B several basic operations are assumed to have taken place including but not limited to the initialization of the Browser Application 1033, initialization of the Application Controller 1041, and the loading of a page.

In the example of FIGS. 11A and 11B, in a first instance, the Application Controller detects a page loaded in Browser Application 1033 is a Resource of a Resource Set (11002). The Application Controller 1041 retrieves the loaded Resource's Resource Data (11004). The Application Controller 1041 builds a DNUI View State and Resource Data Message for that Resource (11006). The Application Controller 1041 publishes the DNUI View State and Resource Data Message (11008). An AUI Controller 1043 receives the DNUI View State and Resource Data Message (11010). An AUI Controller 1043 executes code resulting in the display of a DNUI including Navigation Specific UI Element in or alongside the loaded Resource Page (11012). Upon selection of the displayed Navigation Specific UI Element 1064 the AUI Controller 1043 publishes a Navigate Message (11014). The Application Controller 1041 receives the Navigate Message (11016). The Application Controller retrieves the Resource Data of a Resource intended as a Resource to which the Browser Application will navigate (11018). The Application Controller 1041 changes appropriate Rendered View's URI to that of a Resource intended as the Resource to which the Browser Application 1033 will navigate (11020). The Application Controller 1041 builds a corresponding DNUI View State and Resource Data Message (11022). The Application Controller 1041 publishes the DNUI View State and Resource Data Message (11024). An AUI Controller 1043 receives the DNUI View State and Resource Data Message (11026). The AUI Controller 1043 executes code resulting in display of a Resource's DNUI including its Navigation Specific UI Element 1064 according to the Resource Set's creator's intended scope and sequence in the appropriate Rendered View (11028).

FIGS. 12A and 12B are a series of flowcharts illustrating more detailed example operations of the system 1000 of FIG. 1 as implemented using a Browser-bound configuration as described above. In an example implementation of the process of FIGS. 12A-12B, the Event Broker may be used to broker messages between components (such as between the AUI Controller 1042*a* and Application Controller 1040*a*) even if not expressly described in the process below.

In the example of FIGS. 12A and 12B, operations (12002-12028) are illustrated as discrete operations occurring in a sequential manner. However, it may be appreciated that the operations (12002-12028) may execute in a partially or completely overlapping (e.g., parallel) manner. Further, the operations (12002-12028) may occur in an order different than that shown or may include additional or different operations not specifically illustrated with respect to FIGS. 12A and 12B. In FIGS. 12A and 12B several basic operations are assumed to have taken place including but not limited to the initialization of the Browser Application 1032, initialization of the Application Controller 1040*a*, and the loading of a page into a tab.

In the example of FIGS. 12A and 12B, in a first instance, the Application Controller 1040*a* detects that a page has been loaded into a tab (12002), checks the URI of the page against those of the available Resource Data Set 1026 (12004), and determines that the URI of the page in the tab is part of the Resource Data Set (12006). The latter determination provides the basis for the initial rendering of the Browser-bound DNUI 1020*a* for this figure. However, such a determination will not occur if the URI does not match that of one of the URIs stored as Resource Data in the available Resource Data Set 1026. If that determination does not occur, a separate process may begin that may or may not lead to the Resource Set Navigation Process. Given the determination does occur, the page is understood to be a Resource Page of the Resource Data Set 1026.

The Browser Application 1032 loads the AUI Controller 1042*a*. (12008). The AUI Controller 1042*a* messages the Application Controller 1040*a* through the Event Broker 1068 that the AUI Controller 1042*a* is ready to accept a Dynamic Navigation UI View State and Resource Data Message (12010).

The Application Controller 1040*a* can be configured so that, initially, it does not listen for the Dynamic Navigation UI View State and Resource Data Message; the latter gives the user control over whether the Browser-bound DNUI 1020*a* is displayed for a Resource Page of a Resource Set. As indicated in the figure, an Activate UI Event informs the Application Controller 1040*a* to 1) start listening for messages from the AUI Controller 1042*a*, 2) retrieve the loaded Resource Page's Data and build Dynamic Navigation UI View State and Resource Data Message, and 3) publish the Dynamic Navigation UI View State and Resource Data Message (12012). The Application Controller 1040*a* publishes the Dynamic Navigation UI View State and Resource Data Message (12014). The AUI Controller 1042*a* receives the Dynamic Navigation UI View State and Resource Data Message and executes code resulting in the display of the Browser-bound DNUI 1020*a* (12016).

User selects the Navigation Specific UI Element 1064 on the Browser-bound DNUI to navigate to a Resource of a Resource Set according to the Resource Set's creator's intended scope and sequence (12018). AUI Controller 1042*a* sends a Navigate Message to the Application Controller's Navigate Handler indicating a Resource of a Resource Set to which the user intends to navigate and informing the Application Controller 1040*a* to build a corresponding Dynamic Navigation UI View State and Resource Data Message (12020). The Application Controller 1040*a* can understand from which tab the latter message is received and to which tab the returning message should be sent.

The Application Controller 1040*a* receives the latter message (12022). The Application Controller 1040*a* 1) changes the document URI of the target tab causing the target tab to load the document URI specified by the Application Controller as the URI of the target Resource's Resource Page intended for display; and 2) retrieves the Resource Data and builds the Dynamic Navigation UI View State and Resource Data Message for the AUI Controller 1042*a* associated with the loading Resource Page (12024). The Application Controller 1040*a* publishes the Dynamic Navigation UI View State and Resource Data Message (12026). The AUI Controller 1042*a* receives the Dynamic Navigation UI View State and Resource Data Message and executes code resulting in the display of the Resource's Browser-bound DNUI including its Navigation Specific UI Element 1064 according to the Resource Set's creator's intended scope and sequence in the appropriate tab (12028).

Figure 13B:
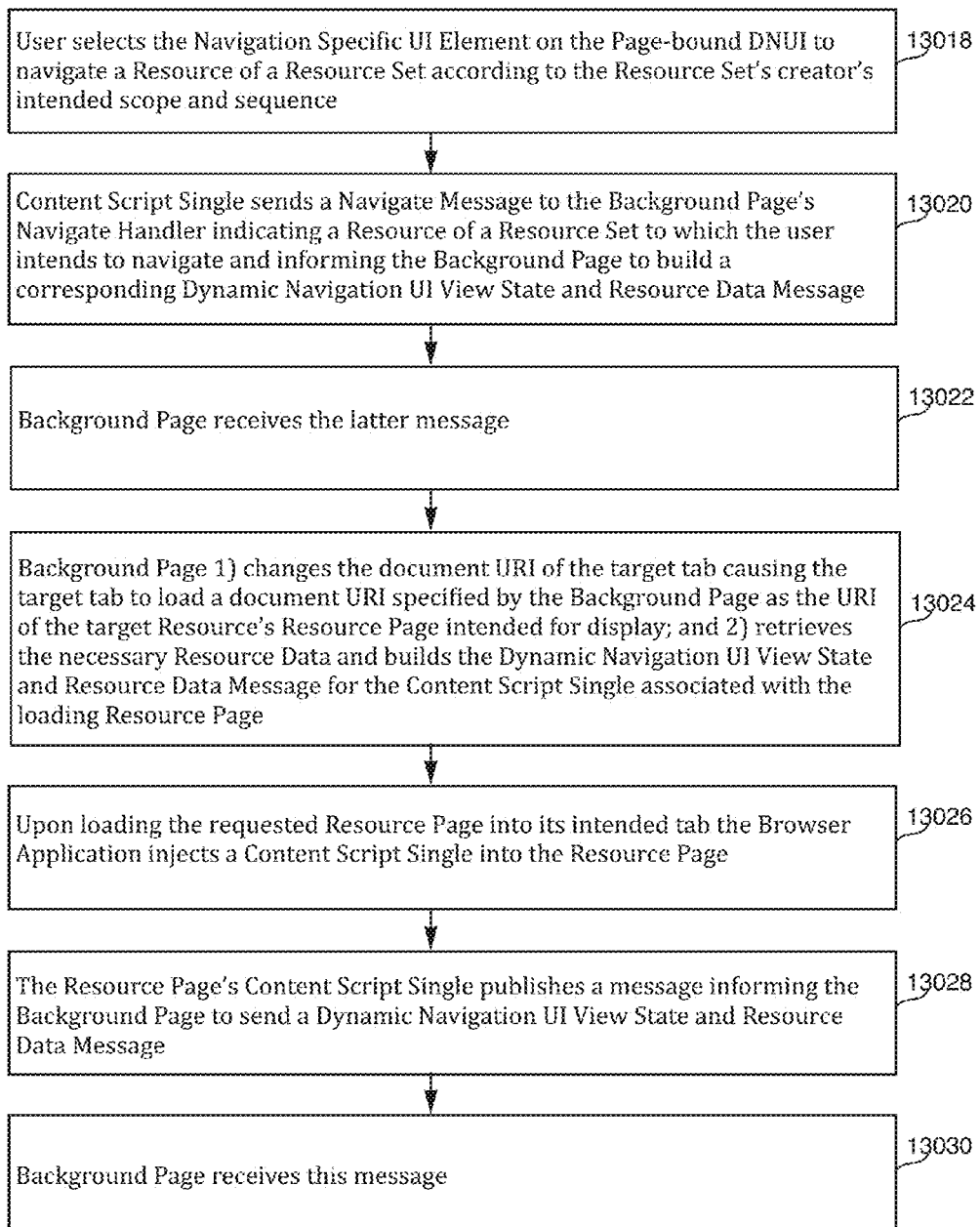
Figure 13C:
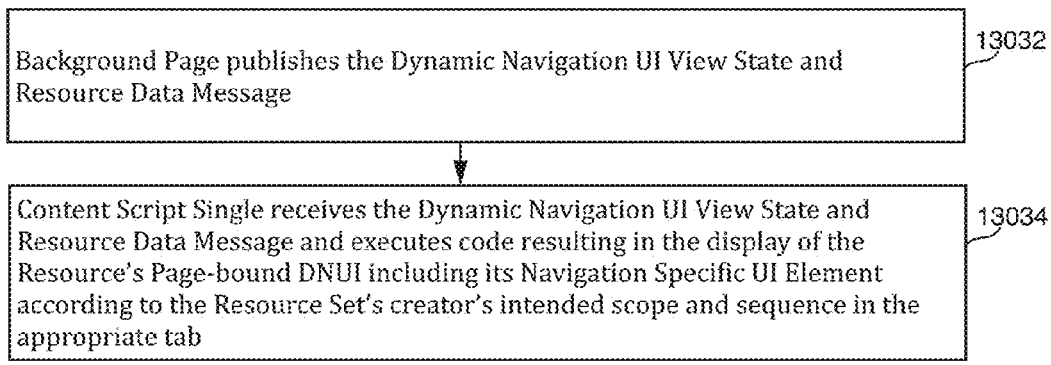

FIGS. 13A, 13B, and 13C are a series of flowcharts illustrating more detailed example operations of the system 1000 of FIG. 1 as implemented using a Page-bound configuration as described above and shown in FIG. 5. In an example implementation of the process of FIGS. 13A-C, the Event Broker 1068 may be used to broker messages between components (such as between the Content Script Single 1070 and Background Page 1050*a*) even if not expressly stated in the example implementation below.

In the example of FIGS. 13A, 13B, and 13C, operations (13002-13034) are illustrated as discrete operations occurring in a sequential manner. However, it may be appreciated that the operations (13002-13034) may execute in a partially or completely overlapping (e.g., parallel) manner. Further, the operations (13002-13034) may occur in an order different than that shown or may include additional or different operations not specifically illustrated with respect to FIGS. 13A, 13B, and 13C. In FIGS. 13A, 13B, and 13C several basic operations are assumed to have taken place including but not limited to the initialization of the Browser Application 1032, initialization of the Background Page 1050*a*, and the loading of a page into a tab.

In the example of FIGS. 13A, 13B, and 13C, in a first instance, the Background Page 1050*a* detects that a page has been loaded into a tab (13002), checks the URI of the page against those of the available Resource Data Set 1026 (13004), and determines that the URI of the page in the tab is part of the Resource Data Set 1026 (13006). The latter determination provides the basis for the initial rendering of the Page-bound DNUI 1022*a* for this figure. However, such a determination will not occur if the URI does not match that of one of the URIs stored as Resource Data in the available Resource Data Set 1026. If that determination does not occur, a separate process may begin that may or may not lead to the Resource Set Navigation Process. Given the determination does occur, the page is understood to be a Resource Page of the Resource Data Set 1026.

The Browser Application 1032 injects a content script, Content Script Single 1070, into the Resource Page in the tab (13008). The Content Script Single 1070 messages the Background Page 1050*a* through the Event Broker 1068 that the Content Script Single 1070 is ready to accept a Dynamic Navigation UI View State and Resource Data Message (13010).

The Background Page 1050*a* can be configured so that, initially, it does not listen for the Dynamic Navigation UI View State and Resource Data Message; the latter gives the user control over whether the Page-bound DNUI 1022*a* is displayed for a Resource Page of a Resource Set. As indicated in the figure, an Activate UI Event informs the Background Page 1050*a* to 1) start listening for messages from the Content Script Single 1070, 2) retrieve the loaded Resource Page's Resource Data and build a Dynamic Navigation UI View State and Resource Data Message, and 3) publish the Dynamic Navigation UI View State and Resource Data Message (13012). The Background Page 1050*a* publishes the Dynamic Navigation UI View State and Resource Data Message (13014). The Content Script Single 1070 receives the Dynamic Navigation UI View State and Resource Data Message and executes code resulting in the display of the Page-bound DNUI 1022*a* (13016).

User selects the Navigation Specific UI Element 1064 on the Page-bound DNUI to navigate a Resource of a Resource Set according to the Resource Set's creator's intended scope and sequence (13018). Content Script Single 1070 sends a Navigate Message to the Background Page's Navigate Handler indicating a Resource of a Resource Set to which the user intends to navigate and informing the Background Page 1050*a* to build a corresponding Dynamic Navigation UI View State and Resource Data Message (13020). The Background Page 1050*a* can understand from which tab the latter message is received and to which tab the returning message should be sent.

The Background Page 1050*a* receives the latter message (13022). The Background Page 1050*a* 1) changes the document URI of the target tab causing the target tab to load a document URI specified by the Background Page as the URI of the target Resource's Resource Page intended for display; and 2) retrieves the Resource Data and builds the Dynamic Navigation UI View State and Resource Data Message for the Content Script Single 1070 associated with the loading Resource Page (13024).

Upon loading the requested Resource Page into its intended tab or Resource Pages into their respective intended tabs, the Browser Application 1032 injects a Content Script Single 1070 into the Resource Page (13026).

The Resource Page's Content Script Single 1070 publishes a message informing the Background Page 1050*a* to send a Dynamic Navigation UI View State and Resource Data Message (13028). The Background Page 1050*a* receives this message from each Resource Page (13030). The Background Page 1050*a* publishes the Dynamic Navigation UI View State and Resource Data Message (13032). The Content Script Single 1070 receives the Dynamic Navigation UI View State and Resource Data Message and executes code resulting in the display of a Resource's Page-bound DNUI 1022*a* including its Navigation Specific UI Element 1064 according to the Resource Set's creator's intended scope and sequence in the appropriate tab (13034).

Figure 14A:
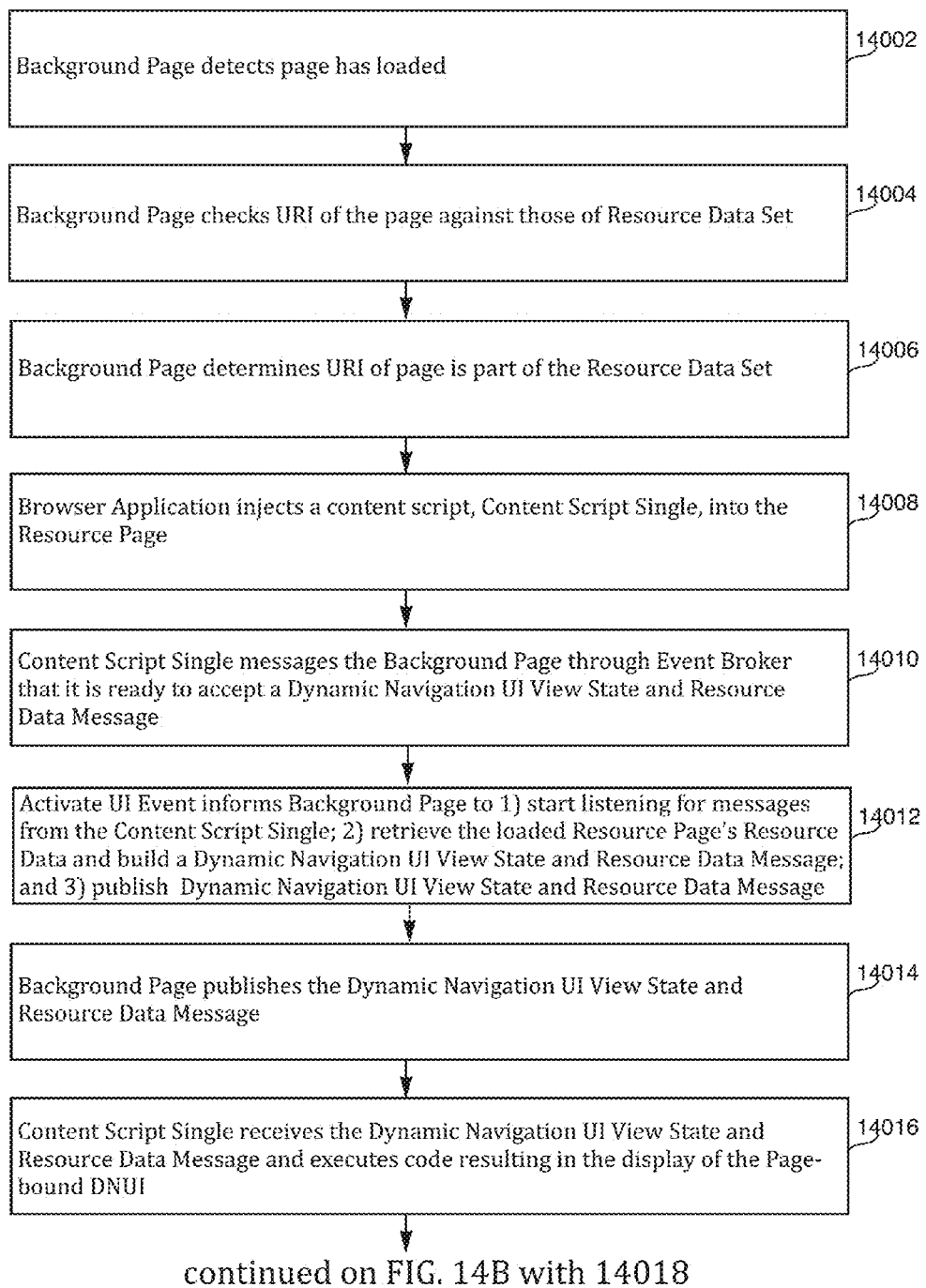
FIGS. 14A-14C are flowcharts illustrating an embodiment of a second process for navigating between digital resources using a dynamic navigation user interface using a page-bound configuration.
Figure 14B:
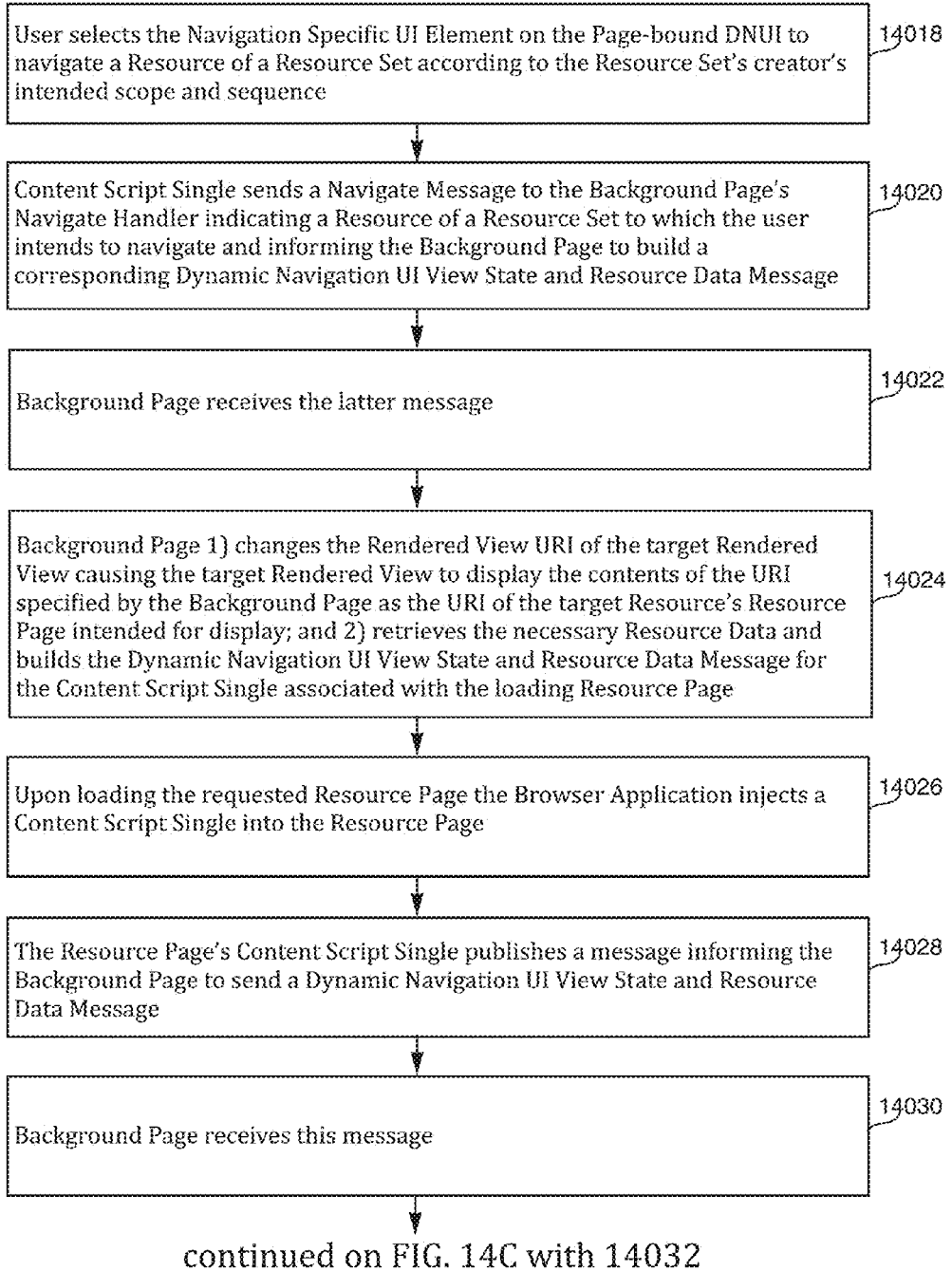
Figure 14C:
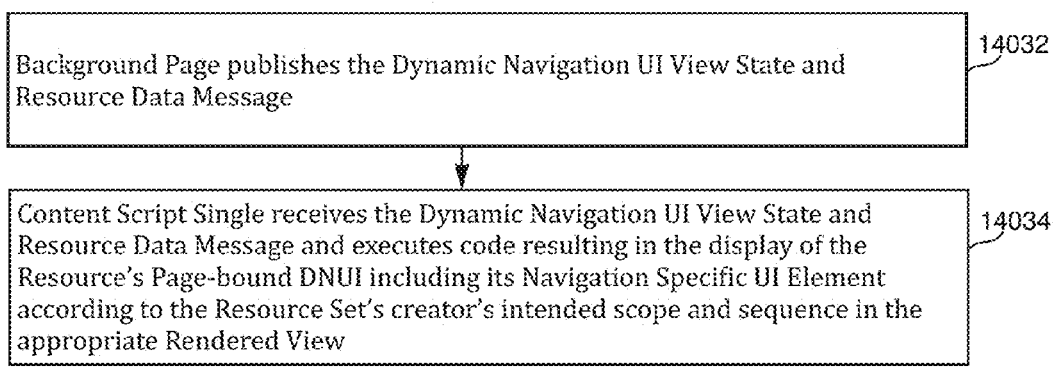
Figure 15D:
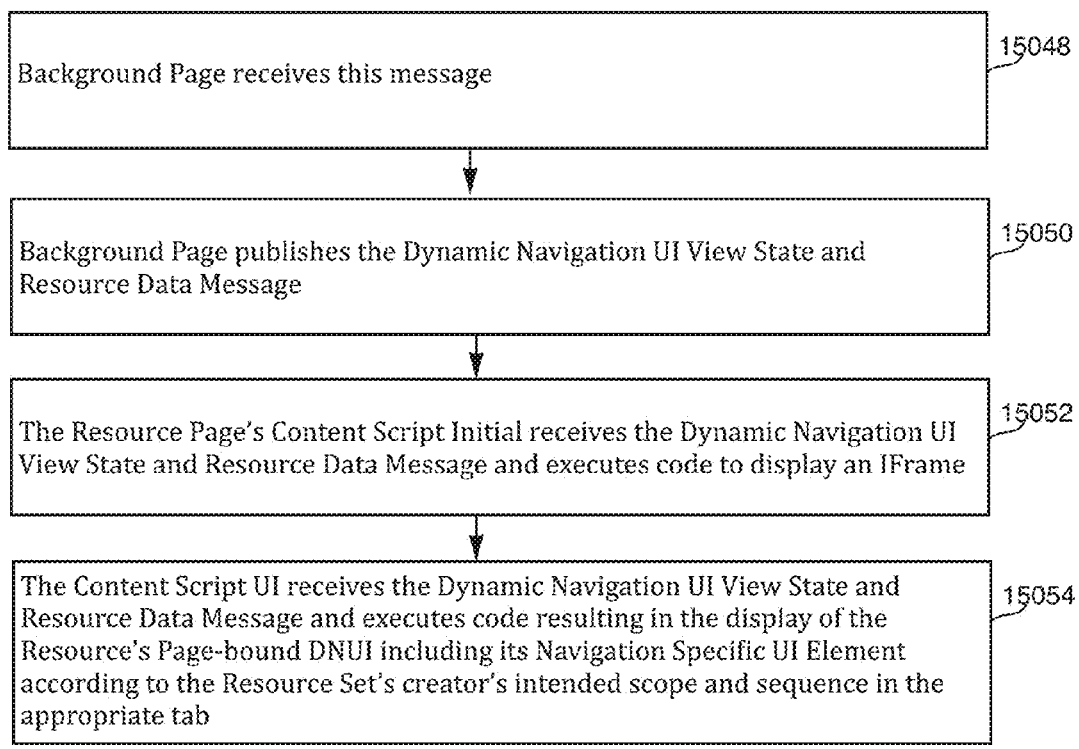

FIGS. 14A, 14B, and 14C are a series of flowcharts illustrating more detailed example operations of the system 1001 of FIG. 2 as implemented using a Page-bound configuration. In an example implementation of FIGS. 14A-C, the Event Broker may be used to broker messages between components (such as the Content Script Single and Background Page 1051*a*) even if not expressly described in the process below.

In the example of FIGS. 14A, 14B, and 14C, operations (14002-14034) are illustrated as discrete operations occurring in a sequential manner. However, it may be appreciated that the operations (14002-14034) may execute in a partially or completely overlapping (e.g., parallel) manner. Further, the operations (14002-14034) may occur in an order different than that shown or may include additional or different operations not specifically illustrated with respect to FIGS. 14A, 14B, and 14C. In FIGS. 14A, 14B, and 14C several basic operations are assumed to have taken place including but not limited to the initialization of the Browser Application 1033, initialization of the Background Page 1051*a*, and the loading of a page.

In the example of FIGS. 14A, 14B, and 14C, in a first instance, the Background Page 1051*a* detects that a page has been loaded into a Browser Application 1033 (14002), checks the URI of the page against those of the available Resource Data Set 1026 (14004), and determines that the URI of the page is part of the Resource Data Set 1026 (14006). The latter determination provides the basis for the initial rendering of the Page-bound DNUI 1023*a* for this figure. However, such a determination will not occur if the URI does not match that of one of the URIs stored as Resource Data in the available Resource Data Set 1026. If that determination does not occur, a separate process may begin that may or may not lead to the Resource Set Navigation Process. Given the determination does occur, the page is understood to be a Resource Page of the Resource Data Set 1026.

The Browser Application 1033 injects a content script, Content Script Single, into the Resource Page (14008). The Content Script Single messages the Background Page 1051*a* through the Event Broker that the Content Script Single is ready to accept a Dynamic Navigation UI View State and Resource Data Message (14010).

The Background Page 1051*a* can be configured so that, initially, it does not listen for the Dynamic Navigation UI View State and Resource Data Message; the latter gives the user control over whether the Page-bound DNUI 1023*a* is displayed for a Resource Page of a Resource Set. As indicated in the figure, an Activate UI Event informs the Background Page 1051*a* to 1) start listening for messages from the Content Script Single, 2) retrieve the loaded Resource Page's Resource Data and build a Dynamic Navigation UI View State and Resource Data Message, and 3) publish the Dynamic Navigation UI View State and Resource Data Message (14012). The Background Page 1050*a* publishes the Dynamic Navigation UI View State and Resource Data Message (14014). The Content Script Single receives the Dynamic Navigation UI View State and Resource Data Message and executes code resulting in the display of the Page-bound DNUI 1023*a* (14016).

User selects the Navigation Specific UI Element 1064 on the Page-bound DNUI to navigate a Resource of a Resource Set according to the Resource Set's creator's intended scope and sequence (14018). Content Script Single sends a Navigate Message to the Background Page's Navigate Handler indicating a Resource of a Resource Set to which the user intends to navigate and informing the Background Page 1051*a* to build a corresponding Dynamic Navigation UI View State and Resource Data Message (14020). The Background Page 1051*a* can understand with which Rendered View the latter message is associated and to which Rendered View the returning message should be sent.

The Background Page 1051*a* receives the latter message (14022). The Background Page 1051*a* 1) changes the URI of the target Rendered View causing the target Rendered View to display the contents of the URI specified by the Background Page as the URI of the target Resource's Resource Page intended for display; and 2) retrieves the Resource Data and builds the Dynamic Navigation UI View State and Resource Data Message for the Content Script Single associated with the loading Resource Page (14024).

Upon loading the requested Resource Page into its intended Rendered View or Resource Pages into their respective intended Rendered Views, the Browser Application 1033 injects a Content Script Single into the Resource Page (14026).

The Resource Page's Content Script Single publishes a message informing the Background Page 1051*a* to send a Dynamic Navigation UI View State and Resource Data Message (14028). The Background Page 1051*a* receives this message from each Resource Page (14030). The Background Page 1051*a* publishes the Dynamic Navigation UI View State and Resource Data Message (14032). The Content Script Single receives the Dynamic Navigation UI View State and Resource Data Message and executes code resulting in the display of a Resource's Page-bound DNUI 1023*a* including its Navigation Specific UI Element 1064 according to the Resource Set's creator's intended scope and sequence in the appropriate Rendered View (14034).

FIGS. 15A, 15B, 15C, and 15D are a series of flowcharts illustrating more detailed example operations of the system 1000 of FIG. 1 as implemented using a Page-bound configuration as described above and shown in FIG. 6. In an example implementation of FIGS. 15A-D, the Event Broker 1068 may broker messages between the Content Scripts and Background Page 1050*b* even if not explicitly described in the process below.

In the example of FIGS. 15A, 15B, 15C, and 15D, operations (15002-15054) are illustrated as discrete operations occurring in a sequential manner. However, it may be appreciated that the operations (15002-15054) may execute in a partially or completely overlapping (e.g., parallel) manner. Further, the operations (15002-15054) may occur in an order different than that shown or may include additional or different operations not specifically illustrated with respect to FIGS. 15A, 15B, 15C, and 15D. In FIGS. 15A, 15B, 15C, and 15D several basic operations are assumed to have taken place including but not limited to the initialization of the Browser Application 1032, initialization of the Background Page 1050*b*, and the loading of a page into a tab.

In the example of FIGS. 15A, 15B, 15C, and 15D, in a first instance, the Background Page 1050*b* detects that a page has been loaded into a tab (15002), checks the URI of the page against those of the available Resource Data Set 1026 (15004), and determines that the URI of the page in the tab is part of the Resource Data Set 1026 (15006). The latter determination provides the basis for the initial rendering of the Page-bound DNUI 1024*a* for this figure. However, such a determination will not occur if the URI does not match that of one of the URIs stored as Resource Data in the available Resource Data Set 1026. If that determination does not occur, a separate process may begin that may or may not lead to the Resource Set Navigation Process. Given the determination does occur, the page is understood to be a Resource Page of the Resource Data Set 1026.

The Browser Application 1032 injects a content script, Content Script Initial 1072, into the Resource Page in the tab (15008). The Content Script Initial 1072 creates and adds an IFrame 1076 to the DOM of the Resource Page in the tab (15010). The Content Script Initial 1072 changes the IFrame's 1076 source to the Layout Template, an .html file (15012). The Layout Template loads a second content script, Content Script UI 1074, into the IFrame 1076 (15014). Content Script UI 1074 is injected into the IFrame 1076 in the Resource Page (15016).

The Content Script UI 1074 messages the Background Page 1050*b* through the Event Broker 1068 that both the Content Script Initial 1072 and Content Script UI 1074 are ready to accept a Dynamic Navigation UI View State and Resource Data Message (15018).

The Background Page 1050*b* can be configured so that, initially, it does not listen for the Dynamic Navigation UI View State and Resource Data Message; the latter gives the user control over whether the Page-bound DNUI 1024*a* is displayed for a Resource Page of a Resource Set. As indicated in the figure, an Activate UI Event informs the Background Page 1050*b* to 1) start listening for messages from the Content Script UI 1074; 2) retrieve the loaded Resource Page's Resource Data and build a Dynamic Navigation UI View State and Resource Data Message, and 3) publish the Dynamic Navigation UI View State and Resource Data Message (15020). The Background Page 1050*b* publishes the Dynamic Navigation UI View State and Resource Data Message (15022). The Content Script Initial 1072 receives the Dynamic Navigation UI View State and Resource Data Message and executes code to display the IFrame 1076 (15024). The Content Script UI 1074 receives the Dynamic Navigation UI View State and Resource Data Message and executes code to render the intended Page-bound DNUI 1024*a* (15026).

User selects the Navigation Specific UI Element 1064 on the Page-bound DNUI 1024*a* to navigate to a Resource of a Resource Set according to the Resource Set's creator's intended scope and sequence (15028). The Resource Page's Content Script UI 1074 sends Navigate Message to the Background Page's Navigate Handler indicating a Resource of a Resource Set to which the user intends to navigate and informing the Background Page 1050*b* to build a corresponding Dynamic Navigation UI View State and Resource Data Message (15030). The Background Page 1050*b* can understand from which tab the latter message is received and to which tab the returning message should be sent.

The Background Page 1050*b* receives the latter message (15032). The Background Page 1050*b* 1) changes the document URI of the target tab causing the target tab to load a document URI specified by the Background Page as the URI of the target Resource's Resource Page intended for display; and 2) retrieves the Resource Data and builds the Dynamic Navigation UI View State and Resource Data Message for the Content Scripts associated with the loading Resource Page (15034).

Upon loading the requested Resource Page into its intended tab the Browser Application injects a Content Script Initial 1072 into the Resource Page (15036). The Content Script Initial 1072 creates and adds an IFrame 1076 to the DOM of the Resource Page in which the Content Script Initial 1072 resides (15038). The Content Script Initial 1072 changes the IFrame 1076 source to the Layout Template, an .html file (15040). The Layout Template loads a second content script, Content Script UI 1074, into the IFrame 1076 (15042). A Content Script UI 1074 is injected into the IFrame 1076 (15044).

The Resource Page's Content Script UI 1074 publishes a message informing the Background Page 1050*b* to send a Dynamic Navigation UI View State and Resource Data Message (15046). The Background Page 1050*b* receives this message from each Resource Page (15048). The Background Page 1050*b* publishes the Dynamic Navigation UI View State and Resource Data Message (15050). The Resource Page's Content Script Initial 1072 receives the Dynamic Navigation UI View State and Resource Data Message and executes code to display an IFrame 1076 (15052). The Content Script UI 1074 receives the Dynamic Navigation UI View State and Resource Data Message and executes code resulting in the display of the Resource's Page-bound DNUI including its Navigation Specific UI Element 1064 according to the Resource Set's creator's intended scope and sequence in the appropriate tab (15054).

As a result of above-described processes of FIGS. 10-15, a computer device enables individuals to build and share presentations utilizing Hosted Information Resources more quickly and effectively than with conventional applications.

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a non-transitory computer-readable storage medium containing computer-executable instructions which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights.

The invention claimed is:

1. A method for controlling navigation of digital resources in a web browser application executing on a client device in a networked computer environment, the method comprising:
   detecting that a webpage has been loaded into the web browser application;
   accessing, by the client device, uniform resource identifiers for an ordered set of digital resources in a resource data set;
   detecting that a uniform resource identifier of the webpage matches a uniform resource identifier of a digital resource of the ordered set of digital resources;
   responsive to detecting that the uniform resource identifier of the webpage matches the uniform resource identifier of the digital resource, executing by a processor of the client device, instructions of a locally stored extension file associated with the web browser application to generate a dynamic navigation user interface for display on a display screen of the client device, the dynamic navigation user interface including a navigation specific user interface control element that when selected causes the web browser to navigate between the ordered set of digital resources in the resource data set;
   causing the display screen of the client to display the webpage and the dynamic navigation user interface in the web browser application;
   receiving an input indicating a selection of the navigation specific user interface control element in the dynamic navigation user interface to navigate to a next webpage of the ordered set of digital resources;
   responsive to the input, identifying from the uniform resource identifiers, a next uniform resource identifier associated with a next webpage in the ordered set of digital resources;
   loading by the web browser application, the next webpage of the ordered set of resources;
   executing instructions to generate an updated dynamic navigation user interface; and
   causing the display screen of the client to display the next webpage and the updated dynamic navigation user interface in the web browser application.

2. The method of claim 1, further comprising:
   detecting if other identifying elements of the webpage matches other identifying elements of the digital resource in the ordered set of digital resources in the resource data set stored in the storage medium,
   wherein executing the instructions of the locally stored extension file is further responsive to detecting that the other identifying elements of the webpage match the other identifying elements of the digital resource.

3. The method of claim 1, wherein causing the display screen of the client to display the webpage and the dynamic navigation user interface in the web browser application includes:
   causing the display screen of the client to display the webpage with the dynamic navigation user interface in a separate pop-window from the webpage in the web browser application.

4. The method of claim 1, wherein causing the display screen of the client to display the next webpage with the dynamic navigation user interface in the web browser application includes:
   causing the display screen of the client to display the next webpage and the dynamic navigation user interface in a separate pop-window from the webpage in the web browser application.

5. The method of claim 1, wherein executing the instructions of the locally stored extension file associated with the web browser application to generate the dynamic navigation user interface comprises:
   generating, by an application controller of the web browser application, a resource data message identifying the uniform resource identifier for the webpage;
   communicating the resource data message from the application controller of the browser application to a user interface controller of the browser application; and
   executing, by the user interface controller of the browser application, the instructions based on the resource data message to generate the dynamic navigation user interface as a browser-bound user interface.

6. The method of claim 1, wherein executing the instructions of the locally stored extension file associated with the web browser application to generate the dynamic navigation user interface comprises:
generating, by an application controller of the web browser application, a resource data message identifying the uniform resource identifier for the webpage;
communicating the resource data message from the application controller of the browser application to a user interface controller of the browser application; and
executing, by the user interface controller of the browser application, the instructions based on the resource data message to generate the dynamic navigation user interface as a page-bound user interface.

7. The method of claim 1, wherein executing the instructions of the locally stored extension file associated with the web browser application to generate the dynamic navigation user interface comprises:
generating, by a background page of an extension application to the browser application executed from the extension file, a resource data message identifying the uniform resource identifier for the webpage;
communicating the resource data message from the background page of the extension application to a content script of the extension application; and
executing, by the content script of the extension application, the instructions based on the resource data message to generate the dynamic navigation user interface as a page-bound user interface.

8. The method of claim 1, wherein executing the instructions of the locally stored extension file associated with the web browser application to generate the dynamic navigation user interface comprises:
generating, by a background page of an extension application to the browser application executed from the extension file, a resource data message identifying the uniform resource identifier for the webpage;
adding, by a first content script of the extension application, an inline frame to the webpage;
loading a second content script into the inline frame;
communicating the resource data message from the background page of the extension application to the first and second content scripts;
executing, by the first content script of the extension application, a first set of the instructions based on the resource data message to display the inline frame; and
executing, by the second content script of the inline frame, a second set of the instructions based on the resource data message to generate the dynamic navigation user interface as a page-bound user interface in the inline frame.

9. A non-transitory computer-readable storage medium storing instruction for controlling navigation of digital resources in a web browser application executing on a client device in a networked computer environment, the instructions when executed by a processor causing the processor to perform steps including:
detecting that a webpage has been loaded into the web browser application;
accessing, by the client device, uniform resource identifiers for an ordered set of digital resources in a resource data set;
detecting that a uniform resource identifier of the webpage matches a uniform resource identifier of a digital resource of the ordered set of digital resources;
responsive to detecting that the uniform resource identifier of the webpage matches the uniform resource identifier of the digital resource, executing by a processor of the client device, instructions of a locally stored extension file associated with the web browser application to generate a dynamic navigation user interface for display on a display screen of the client device, the dynamic navigation user interface including a navigation specific user interface control element that when selected causes the web browser to navigate between the ordered set of digital resources in the resource data set;
causing the display screen of the client to display the webpage and the dynamic navigation user interface in the web browser application;
receiving an input indicating a selection of the navigation specific user interface control element in the dynamic navigation user interface to navigate to a next webpage of the ordered set of digital resources;
responsive to the input, identifying from the uniform resource identifiers, a next uniform resource identifier associated with a next webpage in the ordered set of digital resources;
loading by the web browser application, the next webpage of the ordered set of resources;
executing instructions to generate an updated dynamic navigation user interface; and
causing the display screen of the client to display the next webpage and the updated dynamic navigation user interface in the web browser application.

10. The non-transitory computer-readable storage medium of claim 9, further comprising:
detecting if other identifying elements of the webpage matches other identifying elements of the digital resource in the ordered set of digital resources in the resource data set stored in the storage medium,
wherein executing the instructions of the locally stored extension file is further responsive to detecting that the other identifying elements of the webpage match the other identifying elements of the digital resource.

11. The non-transitory computer-readable storage medium of claim 9, wherein causing the display screen of the client to display the webpage and the dynamic navigation user interface in the web browser application includes:
causing the display screen of the client to display the webpage with the dynamic navigation user interface in a separate pop-window from the webpage in the web browser application.

12. The non-transitory computer-readable storage medium of claim 9, wherein causing the display screen of the client to display the next webpage and the dynamic navigation user interface in the web browser application includes:
causing the display screen of the client to display the next webpage with the dynamic navigation user interface in a separate pop-window from the webpage in the web browser application.

13. The non-transitory computer-readable storage medium of claim 9, wherein executing the instructions of the locally stored extension file associated with the web browser application to generate the dynamic navigation user interface comprises:
generating, by an application controller of the web browser application, a resource data message identifying the uniform resource identifier for the webpage;
communicating the resource data message from the application controller of the browser application to a user interface controller of the browser application; and executing, by the user interface controller of the browser application, the instructions based on the resource data message to generate the dynamic navigation user interface as a browser-bound user interface.

14. The non-transitory computer-readable storage medium of claim 9, wherein executing the instructions of the locally stored extension file associated with the web browser application to generate the dynamic navigation user interface comprises:
generating, by an application controller of the web browser application, a resource data message identifying the uniform resource identifier for the webpage;
communicating the resource data message from the application controller of the browser application to a user interface controller of the browser application; and
executing, by the user interface controller of the browser application, the instructions based on the resource data message to generate the dynamic navigation user interface as a page-bound user interface.

15. The non-transitory computer-readable storage medium of claim 9, wherein executing the instructions of the locally stored extension file associated with the web browser application to generate the dynamic navigation user interface comprises:
generating, by a background page of an extension application to the browser application executed from the extension file, a resource data message identifying the uniform resource identifier for the webpage;
communicating the resource data message from the background page of the extension application to a content script of the extension application; and
executing, by the content script of the extension application, the instructions based on the resource data message to generate the dynamic navigation user interface as a page-bound user interface.

16. The non-transitory computer-readable storage medium of claim 9, wherein executing the instructions of the locally stored extension file associated with the web browser application to generate the dynamic navigation user interface comprises:
generating, by a background page of an extension application to the browser application executed from the extension file, a resource data message identifying the uniform resource identifier for the webpage;
adding, by a first content script of the extension application, an inline frame to the webpage;
loading a second content script into the inline frame;
communicating the resource data message from the background page of the extension application to the first and second content scripts;
executing, by the first content script of the extension application, a first set of the instructions based on the resource data message to display the inline frame; and
executing, by the second content script of the inline frame, a second set of the instructions based on the resource data message to generate the dynamic navigation user interface as a page-bound user interface in the inline frame.

17. A computer device comprising:
a processor; and
a non-transitory computer-readable storage medium storing instructions for controlling navigation of digital resources in a web browser application executing on the computing device in a networked computer environment, the instructions when executed by the processor causing the processor to perform steps including:
detecting that a webpage has been loaded into the web browser application;
accessing, by the client device, uniform resource identifiers for an ordered set of digital resources in a resource data set;
detecting that a uniform resource identifier of the webpage matches a uniform resource identifier of a digital resource of the ordered set of digital resources;
responsive to detecting that the uniform resource identifier of the webpage matches the uniform resource identifier of the digital resource, by a processor of the client device, instructions of a locally stored extension file associated with the web browser application to generate a dynamic navigation user interface for display on a display screen of the client device, the dynamic navigation user interface including a navigation specific user interface control element that when selected causes the web browser to navigate between the ordered set of digital resources in the resource data set;
causing the display screen of the client to display the webpage and the dynamic navigation user interface in the web browser application;
receiving an input indicating a selection of the navigation specific user interface control element in the dynamic navigation user interface to navigate to a next webpage of the ordered set of digital resources;
responsive to the input, identifying from the uniform resource identifiers, a next uniform resource identifier associated with a next webpage in the ordered set of digital resources;
loading by the web browser application, the next webpage of the ordered set of resources;
executing instructions to generate an updated dynamic navigation user interface; and
causing the display screen of the client to display the next webpage and the updated dynamic navigation user interface in the web browser application.

18. The computer device of claim 17, wherein executing the instructions of the locally stored extension file associated with the web browser application to generate the dynamic navigation user interface comprises:
generating, by an application controller of the web browser application, a resource data message identifying the uniform resource identifier for the webpage;
communicating the resource data message from the application controller of the browser application to a user interface controller of the browser application; and
executing, by the user interface controller of the browser application, the instructions based on the resource data message to generate the dynamic navigation user interface as a browser-bound user interface.

19. The computer device of claim 17, wherein executing the instructions of the locally stored extension file associated with the web browser application to generate the dynamic navigation user interface comprises:
generating, by an application controller of the web browser application, a resource data message identifying the uniform resource identifier for the webpage;
communicating the resource data message from the application controller of the browser application to a user interface controller of the browser application; and
executing, by the user interface controller of the browser application, the instructions based on the resource data message to generate the dynamic navigation user interface as a page-bound user interface.

20. The computer device of claim 17, wherein executing the instructions of the locally stored extension file associated with the web browser application to generate the dynamic navigation user interface comprises:

generating, by a background page of an extension application to the browser application executed from the extension file, a resource data message identifying the uniform resource identifier for the webpage;

communicating the resource data message from the background page of the extension application to a content script of the extension application; and executing, by the content script of the extension application, the instructions based on the resource data message to generate the dynamic navigation user interface as a page-bound user interface.

21. The computer device of claim 17, wherein executing the instructions of the locally stored extension file associated with the web browser application to generate the dynamic navigation user interface comprises:

generating, by a background page of an extension application to the browser application executed from the extension file, a resource data message identifying the uniform resource identifier for the webpage;

adding, by a first content script of the extension application, an inline frame to the webpage;

loading a second content script into the inline frame;

communicating the resource data message from the background page of the extension application to the first and second content scripts;

executing, by the first content script of the extension application, a first set of the instructions based on the resource data message to display the inline frame; and executing, by the second content script of the inline frame, a second set of the instructions based on the resource data message to generate the dynamic navigation user interface as a page-bound user interface in the inline frame.

\* \* \* \* \*